US008842308B2

United States Patent
Nozawa

(10) Patent No.: US 8,842,308 B2
(45) Date of Patent: Sep. 23, 2014

(54) IMAGE FORMING DEVICE, IMAGE FORMING DEVICE CONTROLLING METHOD, AND RECORDING MEDIUM

(75) Inventor: Takumi Nozawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 406 days.

(21) Appl. No.: 13/218,518

(22) Filed: Aug. 26, 2011

(65) Prior Publication Data

US 2012/0062922 A1 Mar. 15, 2012

(30) Foreign Application Priority Data

Sep. 14, 2010 (JP) ................................ 2010-205665
Jul. 14, 2011 (JP) ................................ 2011-155482

(51) Int. Cl.
*G06F 1/32* (2006.01)
*H04N 1/00* (2006.01)

(52) U.S. Cl.
CPC ........ *H04N 1/00899* (2013.01); *H04N 1/00928* (2013.01); *H04N 2201/0098* (2013.01); *H04N 1/00323* (2013.01); *H04N 2201/0094* (2013.01); *H04N 1/00477* (2013.01)
USPC .............................. 358/1.14; 399/37; 702/57

(58) Field of Classification Search
USPC .............. 399/9, 37, 88; 702/61; 713/340, 300
See application file for complete search history.

(56) References Cited

U.S. PATENT DOCUMENTS

| 8,724,132 | B2 * | 5/2014 | Nozawa ........................ 358/1.14 |
| 2010/0174935 | A1 * | 7/2010 | Kim et al. ....................... 713/324 |
| 2011/0064431 | A1 * | 3/2011 | Kohri et al. ..................... 399/37 |
| 2011/0304876 | A1 * | 12/2011 | Coffey et al. ................. 358/1.15 |

FOREIGN PATENT DOCUMENTS

JP 2007-106079 4/2007

* cited by examiner

*Primary Examiner* — Marivelisse Santiago Cordero
*Assistant Examiner* — Kent Yip
(74) *Attorney, Agent, or Firm* — IPUSA, PLLC

(57) ABSTRACT

In an image forming device having a plurality of functions, a power measuring unit measures a power consumption of the image forming device, a power consumption computing unit computes a power consumption for execution of one of the plurality of functions based on the measured power consumption, a storage unit stores a target power consumption range for each of the plurality of functions, a measuring mode selecting unit selects one of a measuring mode and a non-measurement mode, and a power consumption estimation unit generates an estimated power consumption for execution of one of the plurality of functions in the non-measurement mode. The measuring mode selecting unit selects the measuring mode when the estimated power consumption in the non-measurement mode is beyond a target power consumption range for a corresponding function from the storage unit.

9 Claims, 17 Drawing Sheets

FIG.4A

| OPERATING MODE | COPIER | PRINTER | SCANNER | FAX |
|---|---|---|---|---|
| REFERENCE VALUE | AWh | BWh | CWh | DWh |
| TARGET RANGE | MEASURED VALUE = REFERENCE VALUE | | | |

FIG.4B

| OPERATING MODE | COPIER | PRINTER | SCANNER | FAX |
|---|---|---|---|---|
| REFERENCE VALUE | AWh | BWh | CWh | DWh |
| TARGET RANGE | MEASURED VALUE < REFERENCE VALUE | | | |

FIG.4C

| OPERATING MODE | COPIER | PRINTER | SCANNER | FAX |
|---|---|---|---|---|
| REFERENCE VALUE | AWh | BWh | CWh | DWh |
| TARGET RANGE | \| MEASURED VALUE − REFERENCE VALUE \| ≦ 0.2 Wh | | | |

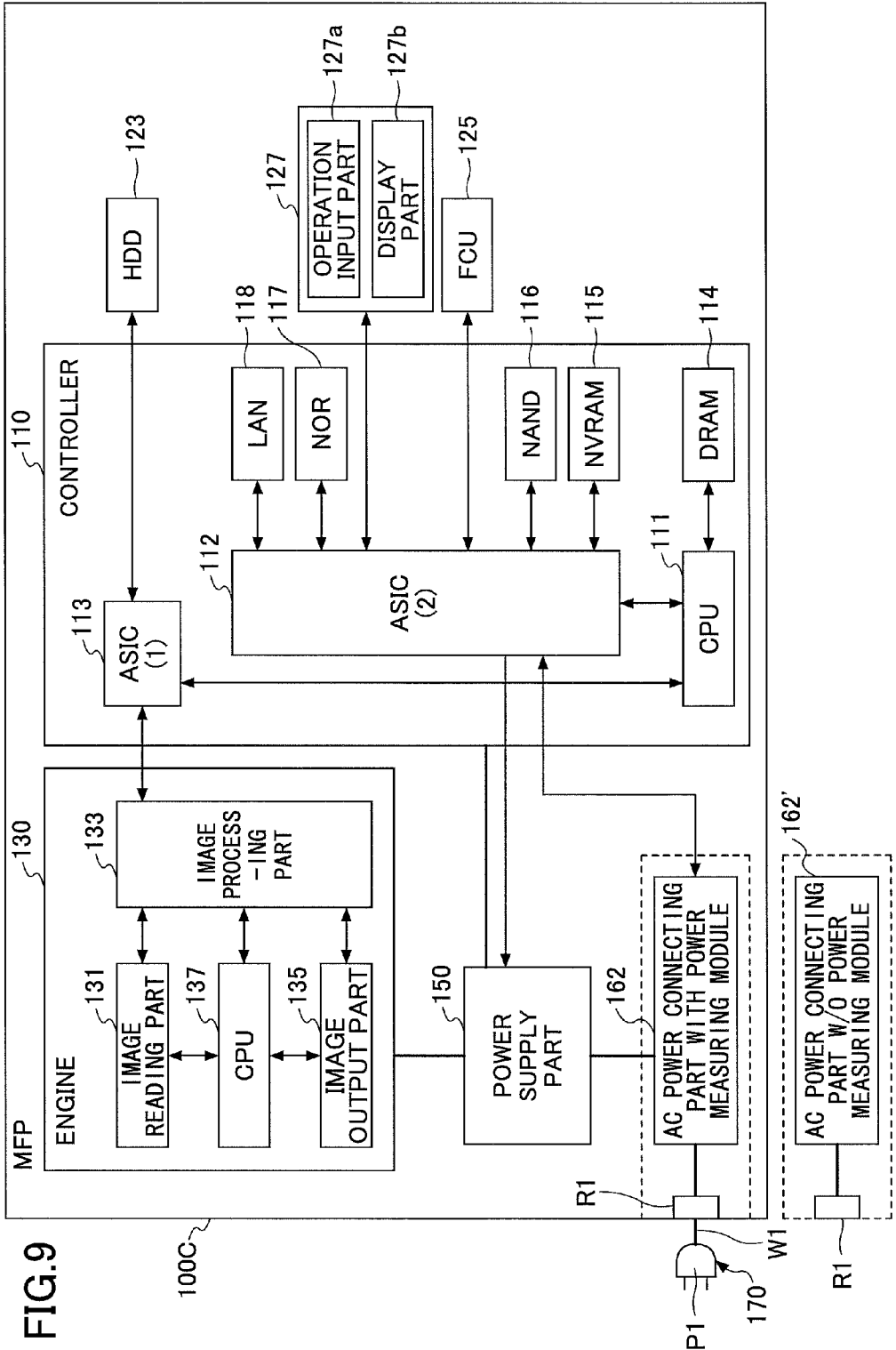

IMAGE FORMING DEVICE, IMAGE FORMING DEVICE CONTROLLING METHOD, AND RECORDING MEDIUM

BACKGROUND OF THE INVENTION

1. Field of the Invention

The present disclosure generally relates to an image forming device, such as a copier, a printer, a fax or an MFP (multifunction peripheral), an image forming device controlling method, and a recording medium. In particular, the present disclosure relates to an image forming device, an image forming device controlling method, and a recording medium, the image forming device being arranged to include a power measuring unit that measures a power consumption of the device and enables a user to monitor a state of the power consumption.

2. Description of the Related Art

In an image forming device, such as a copier, a printer, a fax, or an MFP (multifunction peripheral), which performs image output processing based on the image data obtained from a document by the scanner provided in the image forming device, or based on image data received from an external device, such as a PC (personal computer), reduction of power consumption of the image forming device is demanded with a growing interest in the environmental issues.

For example, Japanese Laid-Open Patent Publication No. 2007-106079 discloses a printer system which is adapted for reducing a power consumption of an image forming device. In this printer system, an image forming device, a network hub (HUB), a PC, an AC power supply, and a wattmeter are included. The network hub is arranged to supply electric power to the image forming device via a network. The PC is arranged to supply electric power to the image forming device via a communication interface, such as a USB (universal serial bus). The AC power supply supplies electric power to these devices in common. The wattmeter measures a total power consumption that is supplied by the AC power supply, and transmits the measured total power consumption to the image forming device.

In the printer system, the power source of the image forming device is switched to one of the AC power supply, the HUB and the PC in accordance with the load condition of the image forming device so as to minimize the total power consumption measured by the wattmeter.

Generally, the respective capacities (or the allowable output power) of the internal power circuits of the AC power supply, the HUB and the PC differ from each other, and the respective efficiencies of AC to DC voltage transform thereof also differ from each other. Hence, in accordance with the load condition (or the power consumption state) of the internal circuit of the image forming device which operates by the resulting DC voltage, a power source having a largest transform efficiency is selected from among the AC power supply, the HUB, and the PC, and electric power is supplied from the selected power source to the image forming device, in order to reduce the power consumption of the whole printer system.

However, in the printer system disclosed in Japanese Laid-Open Patent Publication No. 2007-106079, a power consumption of the wattmeter itself is not taken into consideration, and therefore the fact that an additional power consumption is required for measurement of the power consumption is not taken into consideration. The result of measurement of the power consumption is used only for the switching of the power source in this printer system. Hence, the user cannot view the effect of reducing the power consumption of the whole printer system. The user cannot view the exact amount of the power consumption of the image forming device.

SUMMARY OF THE INVENTION

In one aspect, the present disclosure provides an image forming device which is capable of displaying the exact amount of power consumption that is in conformity with the measured value of the power consumption, and capable of minimizing the increase of the power consumption.

In another aspect, the present disclosure provides an image forming device having a plurality of functions, the image forming device including: a power measuring unit to measure a power consumption of the image forming device; a power consumption computing unit to compute a power consumption for execution of one of the plurality of functions based on the power consumption measured by the power measuring unit; a display unit to display the power consumption computed by the power consumption computing unit; a storage unit to store a target power consumption range for each of the plurality of functions; a measuring mode selecting unit to select one of a measuring mode in which electric power is supplied to the power measuring unit and a non-measurement mode in which electric power is not supplied to the power measuring unit; and a power consumption estimation unit to generate an estimated power consumption for execution of one of the plurality of functions in the non-measurement mode, wherein the measuring mode selecting unit selects the measuring mode when the estimated power consumption in the non-measurement mode generated by the power consumption estimation unit is beyond a target power consumption range for a corresponding one of the plurality of functions from the storage unit.

Other objects, features and advantages of the present disclosure will become more apparent from the following detailed description when read in conjunction with the accompanying drawings.

BRIEF DESCRIPTION OF THE DRAWINGS

FIG. 4A, FIG. 4B and FIG. 4C are diagrams showing examples of a target range table in the MFP of the first embodiment.

FIG. 9 is a block diagram showing the hardware composition of an MFP of a fourth embodiment of the present disclosure.

DETAILED DESCRIPTION OF THE PREFERRED EMBODIMENTS

A description will be given of embodiments of the present disclosure with reference to the accompanying drawings.

In the following, MFPs (multifunction peripherals) of respective embodiments of the present disclosure are illustrated as examples of the image forming device according to the present disclosure.

Figure 1:
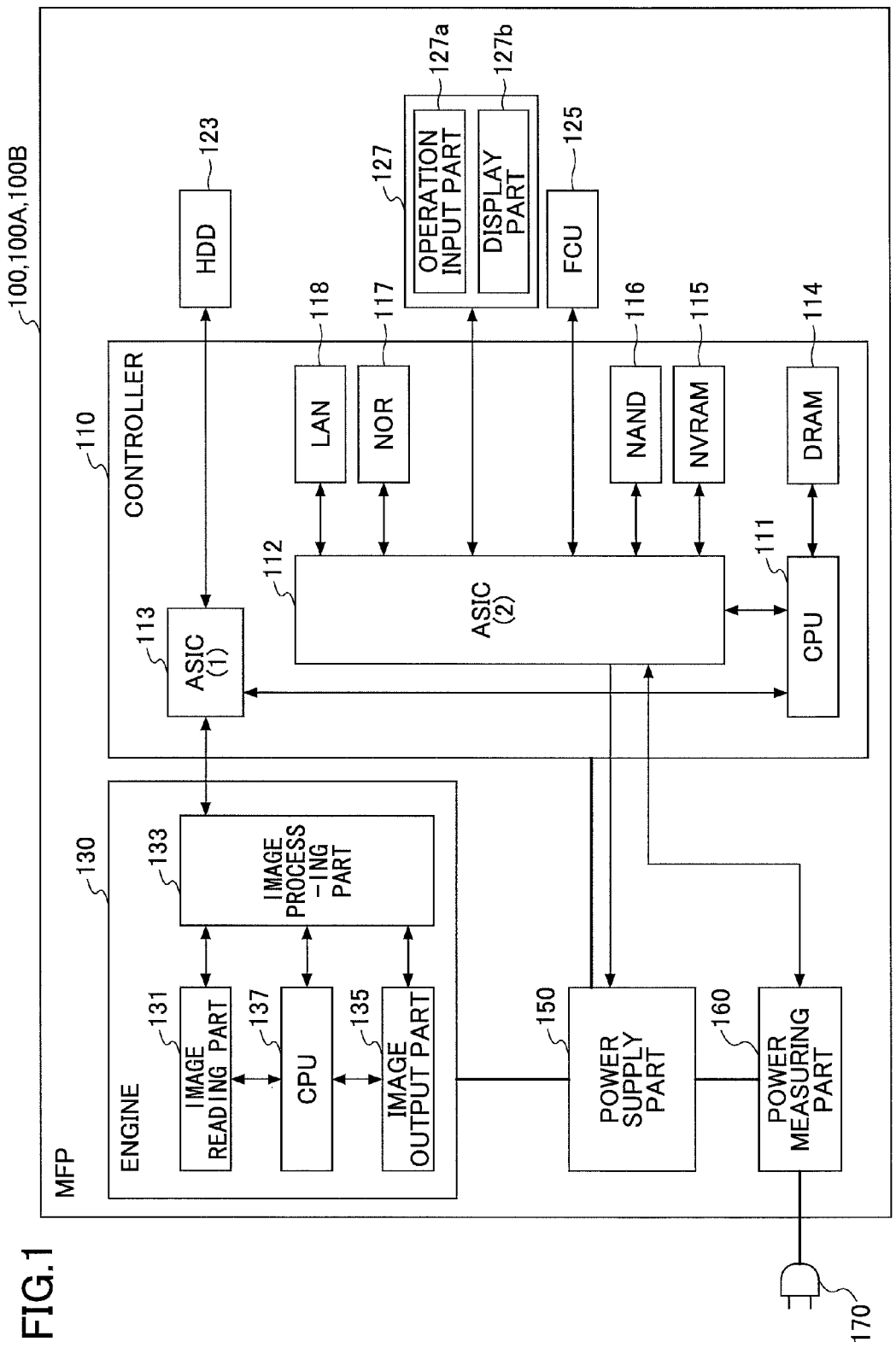
FIG. 1 is a block diagram showing the hardware composition of an MFP (multifunction peripheral) of each of first, second and third embodiments of the present disclosure.

FIG. 1 is a block diagram showing the hardware composition of each of MFPs 100, 100A and 100B of the first, second and third embodiments of the present disclosure.

As shown in FIG. 1, a controller 110 controls the whole MFP of each of the first, second and third embodiments. Under the control of the controller 110, an engine 130, a HDD (hard disk drive) 123, an FCU (facsimile control unit) 125, an operation part 127, a power supply part 150, and a power measuring part 160 respectively operate in conjunction with each other.

The controller 110 is constructed to include a CPU (central processing unit) 111, an NAND type flash memory 116, an NVRAM (non-volatile random access memory) 115, an NOR type flash memory 117, and a DRAM (dynamic random access memory) 114. The thus constructed controller 110 functions as a computer, and with a control program and control data, which are stored in the flash memory, the computer executes the program, read from the flash memory and loaded on the RAM, to perform the functions as a control unit. The controller 110 stores and manages the device configuration information (for each of the MFPs 100, 100A and 100B) in the NVRAM 115.

Under the control of the CPU 111, an ASIC (application-specific integrated circuit) (2) 112 controls the power supply part 150, the power measuring part 160, the operation part 127, the FCU 125, the various memories (the NOR 117, the NAND 116, the NVRAM 115), and the data I/O (input/output) units. Moreover, under the control of the CPU 111, an ASIC (1) 113 controls the image processing, such as compression/decompression, and the HDD 123 (which may be replaced by a nonvolatile memory). The controller 110 further includes a LAN interface 118 for connection of the MFP with an external device over a LAN (local area network), such as a PC (personal computer), via the ASIC (2) 112.

The engine 130 is constructed to include an image reading part 131, an image output part 135, an image processing part 133, and a CPU 137. The image reading part 131 reads an image from a document and generates image data electronically. The image output part 135 prints image data on a sheet of paper or the like. The image processing unit 133 performs various processes (image processing, compensation, editing, characteristics detection, conversion, etc.) to image data. The CPU 137 controls operation of these parts of the engine 130.

The FCU 125 is constructed to include a data processing part of the transmitting/receiving of a FAX signal and a communication interface. The FCU 125 provides a unit for performing a facsimile function of the MFP.

The operation part 127 functions as a user interface and is constructed to include an operation input part 127a and a display part 127b. The operation input part 127a receives an operation or instructions input by a user to perform image processing, etc. The display part 127b displays an operating condition of the device (MFP) which is set up according to the instructions, and a state of the device which changes with the operation of the device.

The operation input part 127a of the operation part 127 functions as a data input unit that receives data input by the user, and functions as an instruction input unit that receives operating instructions input by the user. The display part 127b of the operation part 127 functions as a display unit that displays a power consumption computed based on a power consumption which is measured by the power measuring part 160 which will be described below. It is assumed that, in each of the embodiments, the operation part 127 is normally in an active state.

The power supply part 150 receives electric power from a commercial AC power supply via a connecting unit 170, such as a plug, and the power measuring part 160, and supplies the DC or AC power to the various components of the MFP.

The power measuring part 160 is a power measuring unit that measures a power consumption of the device (MFP). The power measuring part 160 measures the power supplied just behind the connecting unit 170, such as a plug, and measures the power consumption of the whole MFP in which the power is internally consumed. The power measuring part 160 outputs the measured power consumption to the controller 110.

In each embodiment, each time the power measuring part 160 performs the power measuring operation, the power is consumed in the power measuring part 160. Therefore, the controller 110 is configured to turn on or off the supply of electric power to the power measuring part 160 (or to select one of a power supply start and a power supply stop). When the power measurement is not performed, the controller 110 turns off the electric power supply to the power measuring part 160 to reduce the power consumption of the MFP. The details of ON/OFF of the electric power supply to the power measuring part 160 will be described below with reference to FIG. 15.

In the MFP of each embodiment, a scanner function, a copier function, a printer function, a facsimile receiving function, and a facsimile transmitting function are performed under control of the controller 110.

When the scanner function is performed, an image is read from a document by the image reading part 131 to generate image data, and the image data is processed by the image processing unit 133 and temporarily stored in the HDD 123 through the ASIC (1) 113.

When the copier function is performed, image data generated from a document by the image reading part 131 is temporarily stored in the HDD 123 through the image processing unit 133 and the ASIC (1) 113. The image data stored in the HDD 123 is transferred to the image output part 135 through the ASIC (1) 113 and the image processing unit 133, and the image output part 135 outputs the image data (printing).

When the printer function is performed, the image data stored in the HDD 123 or the image data received from an external device via the LAN I/F 118 is processed as follows.

The image data is transferred to the image output part 135 through the ASIC (1) 113, the ASIC (2) 112, the CPU 111, and the image processing unit 133, and the image output part 135 outputs the image data (printing).

When the facsimile receiving function is performed, the image data received from an external device by the FCU 125 is transferred to the image output part 135 through the ASIC (2) 112, the CPU 111, the ASIC (1) 113, and the image processing unit 133, and the image output part 135 outputs the image data (printing).

When the facsimile transmitting function is performed, the image data of the document from the image reading part 131 is processed through the image processing unit 133, the ASIC (1) 113, the CPU 111, and the ASIC (2) 112, and transmitted to an external device by the FCU 125.

The controller 110 functions as a power consumption estimation unit that generates an estimated power consumption for execution of a predetermined function, for example, when a program is executed by the CPU 111. The predetermined function may be considered two or more of the plurality of functions, including a copier function, a scanner function, a printer function, and a facsimile function (a facsimile receiving function and a facsimile transmitting function), as the functions of the MFP. Moreover, the controller 110 functions as a power consumption computing unit that computes a power consumption for execution of one of the functions of the MFP based on the power consumption measured by the power measuring part 160, for example, when a program is executed by the CPU 111.

For example, the power consumption for execution of a function of the MFP in this case may be defined as an integral of a consumed power of the MFP over an interval from a start of execution of the function to an end of the execution of the function (or a time integration value of the power in units of Wh). Namely, a value of the power consumption for execution of the function can be considered as a time integration value of the power consumption measured by the power measuring part 160 over an interval from a start of execution of the function to an end of the execution of the function. For example, the value of the power consumption for execution of the function concerned, acquired by the controller 110 as the power consumption computing unit, is the time integration value which is the integral of the power consumption values output in real time from the power measuring part 160 from the start of execution of the function to the end thereof.

Alternatively, the power measuring part 160 may be arranged to compute the value of the power consumption based on the measurement values. In this case, the increment of power consumption values output from the power measuring part 160 over the interval from the start of execution of the function of the MFP to the end thereof is equivalent to the amount of power consumption for execution of the function.

It is assumed that an application program (software) which controls execution of each function of the MFP has a function to output a start signal at the start of execution of the function concerned and output an end signal at the end of the execution of the function. The controller 110 as the power consumption computing unit receives the output signal from the application program, obtains each timing of the start and the end of the execution of the function concerned, and compute a value of the power consumption for execution of the function based on the output values of the power measuring part 160 received over the interval.

Alternatively, the power measuring part 160 may be arranged to compute the power consumption value based on the measurement values by receiving a signal indicating each of a start timing and an end timing of the execution of the function concerned. In this case, the power measuring part 160 functions also as the power consumption computing unit.

Further, the controller 110 functions as a measuring mode selecting unit that selects one of a measuring mode in which electric power is supplied to the power measuring part 160 and a non-measurement mode in which electric power is not supplied to the power measuring part 160, for example, when a program is executed by the CPU 111. Further, the controller 110 functions as a selection unit that selects one of an ON state and an OFF state of the measuring mode selecting unit, for example, when a program is executed by the CPU 111. Further, the controller 110 functions as a measurement control unit that controls ON/OFF of the supply of electric power to the power measuring part 160. The NAND type flash memory 116 functions as a storage unit that store a target power consumption range for each of the plurality of functions of the MFP, and the target power consumption ranges for the respective functions of the MFP are stored beforehand in the NAND type flash memory 116 as a target range table.

In the MFP having the composition as described above with reference to FIG. 1, if an electric power supply is started, the power supply part 150 starts supplying electric power to the controller 110, and thereafter starts supplying electric power to the engine 130 in response to the instructions from the ASIC (2) 112 of the controller 110.

Next, an example of a process performed by the controller 110 of the MFP at power-on of the MFP will be described with reference to FIG. 2.

First, a user connects the connecting unit 170, such as a plug of the MFP, to a plug socket of a commercial power source and turns on a power switch (not illustrated) of the MFP. As a result, the power supply part 150 starts the supply of electric power to the controller 110 (step S101).

Subsequently, in response to the instructions from the ASIC (2) 112 of the controller 110, the program stored in the NOR type flash memory 117 is executed by the CPU 111, and the controller 110 starts the process based on the program (step S102).

Subsequently, the power supply part 150 starts the supply of electric power to the engine 130 in response to the instructions from the ASIC (2) 112 (step S103). Thereby, the MFP is in a normal operation state that can perform image processing, such as printing.

Subsequently, the ASIC (2) 112 determines the reception of a power supply stop (OFF) request to the electric power supply started in step S101 (step S104). When there is a power supply stop request, processing of the power supply stop is performed (step S107) and the operation is terminated. The processing of power supply stop is, for example, a process in which the power supply part 150 stops the electric power supply to the engine 130 and stops the electric power supply to the controller 110 in response to the instructions from the ASIC (2) of the controller 110.

On the other hand, when there is no power supply stop request, the ASIC (2) 112 check whether there is any job processing request, such as a printing request (step S105).

When there is no job processing request, the control is returned to the check of a power supply stop request at the step S104. When there is a job processing request, an application program (software) required for processing of the requested job is performed (step S106), and the control is returned to the check of a power supply stop request at the step S104.

Characteristic operations which are performed by the MFP (FIG. 1) are as follows. The power consumption which is computed by the power consumption computing unit based on the power consumption measured by the power measuring part 160 is displayed on the display part 127b of the operation part 127, and the display part 127*b* functions as a user interface. Moreover, the ON/OFF state of the electric power supply to the power measuring part 160 is controlled to select one of the ON and OFF states of the power measuring part 160.

In each of the following embodiments, a target value of the power consumption for each of the plurality of functions described in a target range table stored in the NAND type flash memory 116 is read out. When the power consumption computed by the power consumption computing unit based on the power consumption measured by the power measuring part 160 is beyond a target range of the power consumption of a corresponding function, the supply of electric power to the power measuring part 160 is continued. Moreover, the power consumption computed by the power consumption computing unit based on the power consumption measured by the power measuring part 160 is displayed on the display part 127*b* of the operation part 127.

When the power consumption computed by the power consumption computing unit based on the power consumption measured by the power measuring part 160 is within a target range of the power consumption of a corresponding function, the supply of electric power to the power measuring part 160 is stopped to reduce the power consumption.

After stopping the electric power supply to the power measuring part 160, the power consumption cannot be measured. In this case, an estimated power consumption is generated. When the estimate power consumption is beyond the target range of the power consumption of the corresponding function, the supply of electric power to the power measuring part 160 is started.

The above-described process will be called a process of power consumption computation and display sequence.

By performing the process, when the power consumption computed based on the current measurement value or the estimated power consumption is beyond the target range of the power consumption of the corresponding function, the electric power supply to the power measuring part 160 is started. The power consumption computed by the power consumption computing unit based on the power consumption measured by the power measuring part 160 is displayed on the display part 127*b* of the operation part 127, which is presented to a user on the operation part 127.

On the other hand, when the power consumption computed based on the current measurement value or the estimated power consumption is within the target range of the power consumption, the electric power supply to the power measuring part 160 is stopped to reduce the power consumption.

Figure 3:
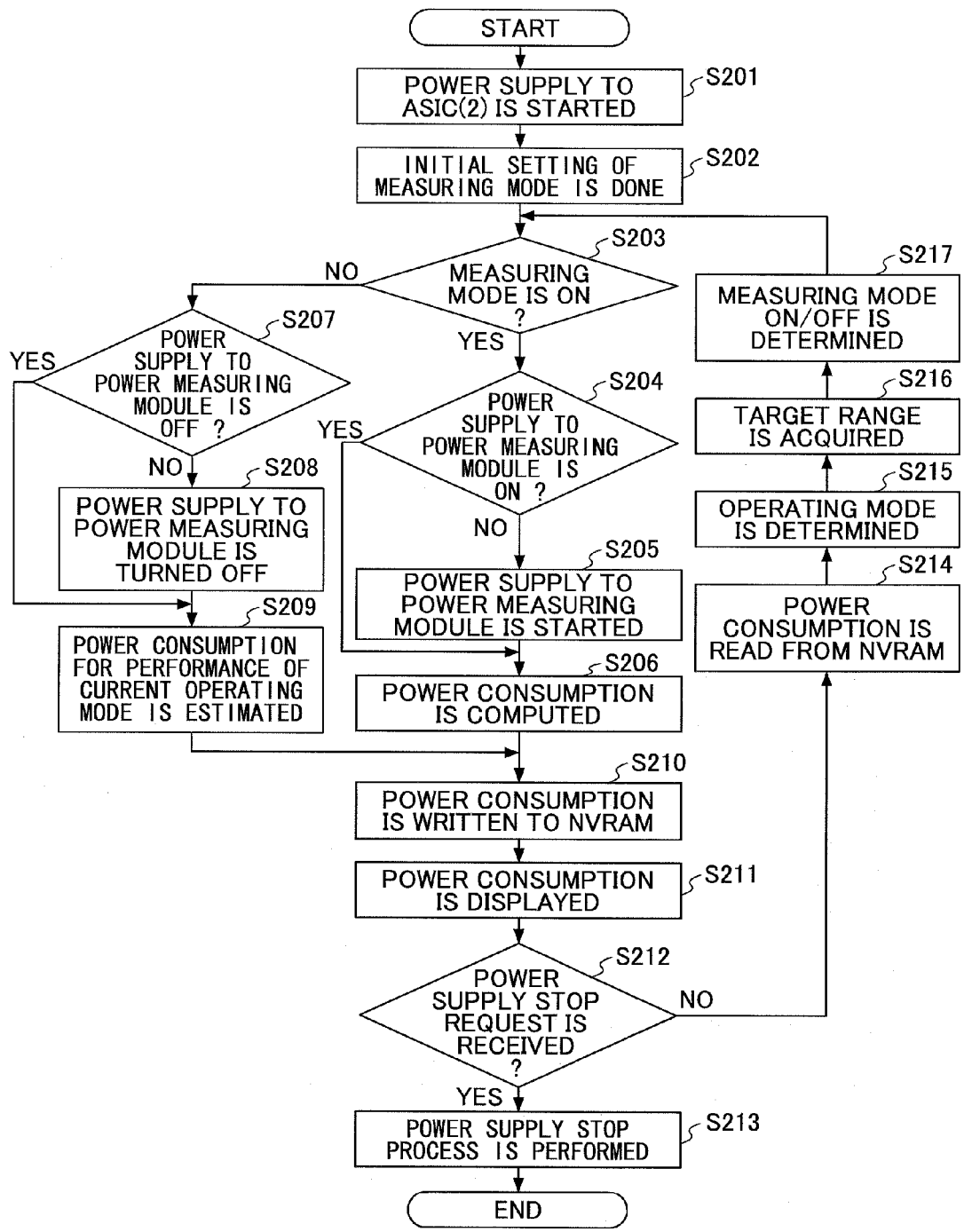
FIG. 3 is a flowchart for explaining a process of power consumption computation and display sequence performed by the MFP of the first embodiment.
Figure 11:
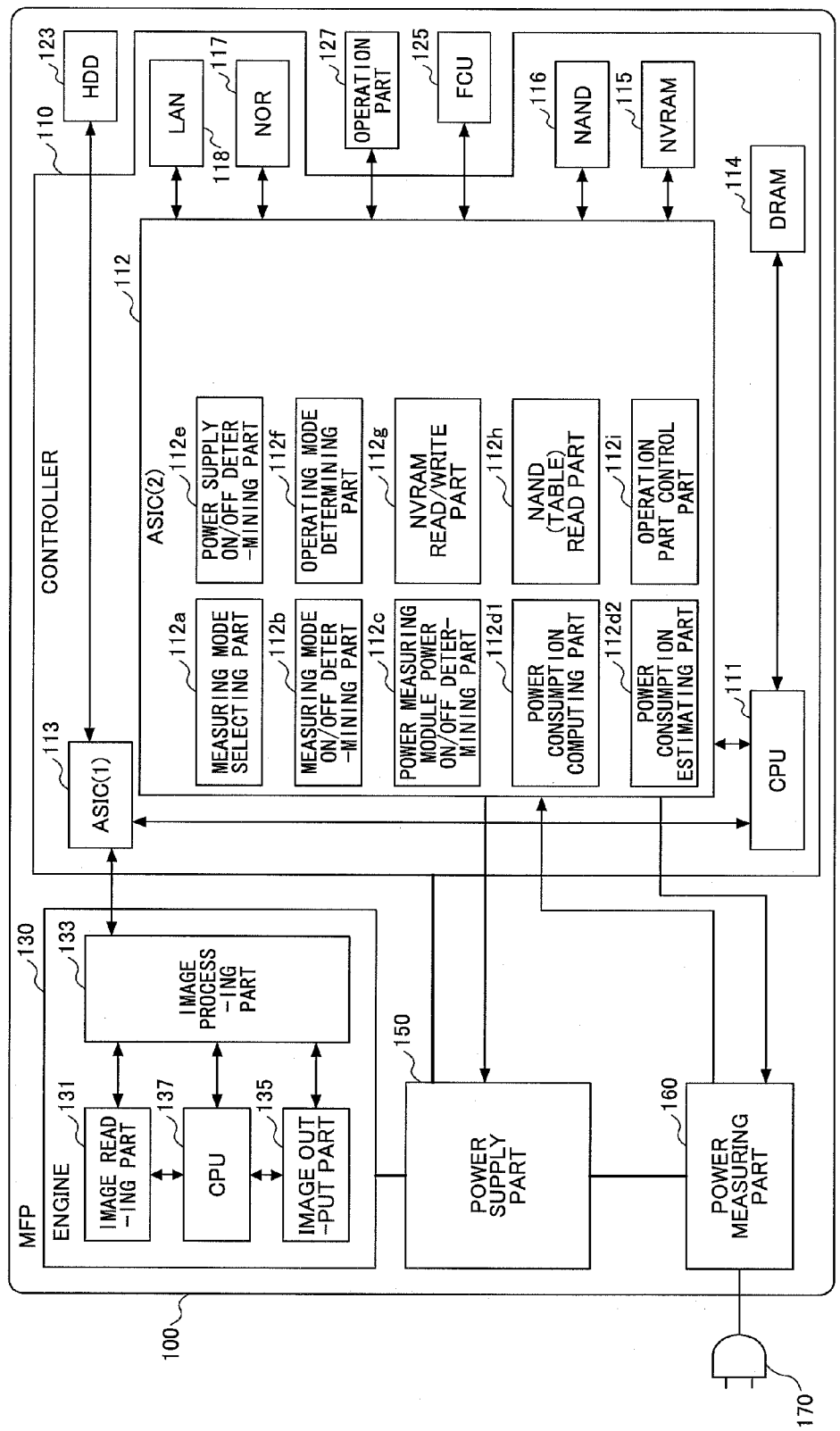
FIG. 11 is a block diagram showing the functional composition of an ASIC (2) in the MFP of the first embodiment.

FIG. 3 is a flowchart for explaining a process of power consumption computation and display sequence performed by the MFP 100 of the first embodiment. FIG. 11 is a block diagram showing the functional composition of the ASIC (2) in the MFP 100 of this embodiment.

Figure 2:
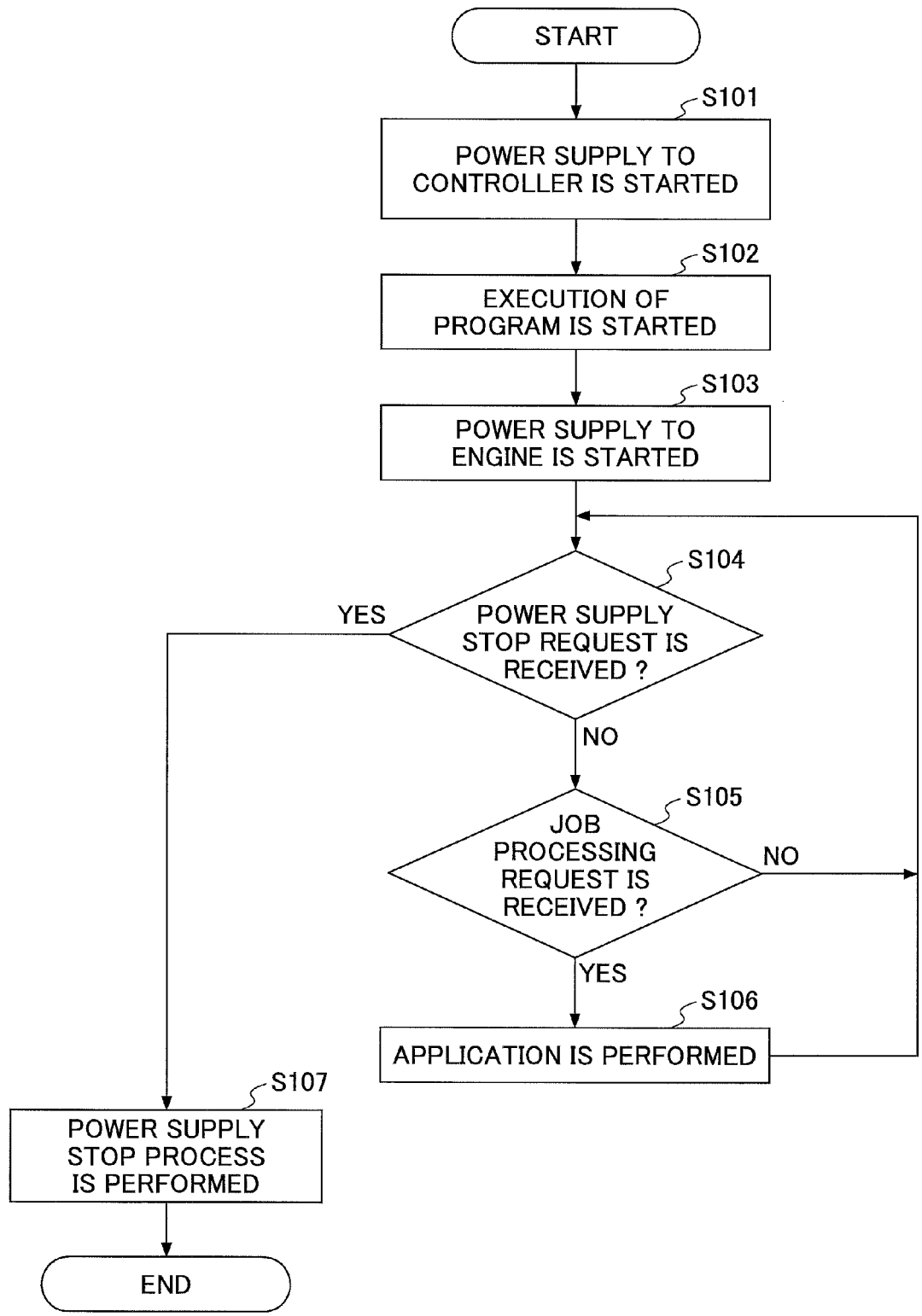
FIG. 2 is a flowchart for explaining a process performed by a controller of the MFP of each embodiment at power-on of the MFP.

The relationship between the flowchart of FIG. 3 and the flowchart of FIG. 2 is as follows. The process in the flowchart of FIG. 3 is performed by the ASIC (2) 112 of the controller 110. The following operation is repeated over an interval between a time the electric power supply to the controller 110 is started at step S101 in the flowchart of FIG. 2 and a time the electric power supply to the controller 110 is stopped at step S107 in the flowchart of FIG. 2. Namely, the operation repeated over the interval is the procedure of steps S203-S212 and S214-S217 in the flowchart of FIG. 3, and this procedure is repeatedly performed over an interval from a time the electric power supply is started and the initial setting of the measuring mode is performed (steps S201-S202) to a time the electric power supply is stopped (S213).

The process in the flowchart of FIG. 3 is started when the electric power supply to the ASIC (2) 112 of the controller 110 is started and the ASIC (2) 112 is in an operating state (step S201). The ASIC (2) 112 performs an initial setting of a measuring mode to determine how a measuring operation of the power consumption is performed by the power measuring part 160 (which may also be called power measuring module 160) (step S202).

For example, this initial setting is performed by reading an initial value from the NVRAM 115 and storing the initial value in the DRAM 114 (which is a temporary storage device) as the set value of the current measuring mode. The operation of step S202 may be performed by a measuring mode selecting part 112*a* of the ASIC (2) 112 of the controller 110 as shown in FIG. 11.

Subsequently, the ASIC (2) 112 determines whether the set value of the current measuring mode stored in the DRAM 114 is "measuring mode ON" (step S203). When it is determined in step S203 that the set value is "measuring mode ON", the ASIC (2) 112 determines the ON/OFF state of the electric power supply to the power measuring module 160 (step S204). The operation of step S203 may be performed by a measuring mode ON/OFF determining part 112*b* of the ASIC (2) 112 of the controller 110 as shown in FIG. 11. The operation of step S204 may be performed by a power measuring module power ON/OFF determining part 112*c* of the ASIC (2) 112 of the controller 110 as shown in FIG. 11.

In a case of "measuring mode ON", the power measuring module 160 is operated to measure the power consumption. Therefore, when the result of the determination at step S204 is affirmative "electric power supply ON (which indicates that the power measuring module 160 is now supplying the electric power)", the power measuring module 160 is already in an operating state, and no further operation is performed.

On the other hand, when the result of the determination at step S204 is negative "electric power supply OFF (which indicates the electric power supply stop)", the electric power supply to the power measuring module 160 is started to operate the power measuring module 160 (step S205). The operation of step S205 may be performed by a power measuring module power ON/OFF determining part 112*c* of the ASIC (2) 112 of the controller 110 as shown in FIG. 11.

When the result of the determination at step S204 is affirmative, or after the step S205 is performed, the power measuring module 160 measures the power consumption of the MFP 100. The ASIC (2) 112 functions as a power consumption computing unit and computes a power consumption of the MFP over an interval between a start of execution of the function and an end of the execution of the function, based on the power consumption measured by the power measuring module 160 (step S206). The function concerned may be also called a predetermined function used as a basis of the computed power consumption. The computation operation of step S206 may be performed by a power consumption computing part 112*d*1 of the ASIC (2) 112 of the controller 110 as shown in FIG. 11. As previously described, the power consumption is computed as an integral of a consumed power over an interval (or a time integration value of "power×time"). The predetermined function refers to one of a copier function, a scanner function, a printer function, a facsimile function, etc. of the MFP.

On the other hand, when it is determined in step S203 that the set value is "measuring mode OFF", the ASIC (2) 112 determines the ON/OFF state of the electric power supply to the power measuring module 160 (step S207).

When it is determined in step S207 as being "power supply OFF" (which indicates that the electric power supply to the power measuring module 160 is OFF), the power measuring module 160 is already in a non-operating state, and no further operation is performed.

On the other hand, when it is determined in step S207 as being "power supply ON" (which indicates that the electric power supply to the power measuring module 160 is ON), the ASIC (2) 112 stops the supply of electric power to the power measuring module 160 in order to deactivate the power measuring module 160 (step S208). The operation of steps S207 and S208 may be performed by as the power measuring module power ON/OFF determining part 112c of the ASIC (2) 112 of the controller 110 as shown in FIG. 11. By performing these steps S203-S205, S207, S208, the ASIC (2) 112 of the controller 110 function as a measurement control unit.

When the result of the determination at step S207 is affirmative, or after the step S208 is performed, the power measuring module 160 is in a non-operating state and does not perform the power measurement. Hence, the ASIC (2) 112 of the controller 110 generates an estimated power consumption of the MFP over an interval from a start of execution of the function to an end of the execution of the function (step S209). The function concerned may be also called a predetermined function used as a basis of the estimated power consumption. The predetermined function refers to one of a copier function, a scanner function, a printer function, a facsimile function, etc. of the MFP. The computation operation of step S209 may be performed by a power consumption estimating part 112d2 of the ASIC (2) 112 of the controller 110 as shown in FIG. 11.

As a method of generating an estimated power consumption, the following method may be used. For example, respective power consumption values of the MFP 100 at the time of execution of a copier function, a scanner function, a printer function, a facsimile function, etc. are beforehand computed experimentally and an estimated power consumption for each function is computed based on the computed power consumptions values. In this case, if the conditions used as a basis of estimation when the power consumption values are experimentally computed differ from the conditions for execution of the predetermined function related to the estimation in step S209, an error will be produced. To eliminate the error, compensation is needed in order to obtain an estimated power consumption value near the actual measurement value. The conditions for execution of the predetermined function may include, for example, a resolution at a time of scanning (image input) or printing (image output), the number of recording sheets related to execution of the function concerned, a size of a recording sheet, a direction of a recording sheet (longitudinal or transverse), etc.

Upon the experiment, a measured value of the power consumption of the MFP 100 for each recording sheet when a predetermined function is performed with a predetermined sheet direction, a predetermined paper size, and a predetermined resolution being used, is obtained as a reference value, respectively. Furthermore, when generating an estimated power consumption at the step S209, a reference value of the predetermined function currently performed is computed based on the reference values of the respective predetermined functions. The computed reference value is multiplied by the number of sheets for which the predetermined function is currently performed. And an estimated power consumption which is in conformity with the contents of the predetermined function currently performed can be generated by correcting the acquired reference value according to the recording sheet direction, the paper size, the resolution, etc. related to the predetermined function currently performed. For example, the information related to the predetermined function currently performed, including the number of recording sheets, the paper size, the resolution, the recording sheet direction, etc., can be acquired by the function of the application program (software) which performs the function concerned.

The operating mode of the MFP 100 which will be described below with reference to FIGS. 4A-4C corresponds to one of the plurality of functions of the MFP, including a copier function, a scanner function, a printer function, and a facsimile function. Specifically, when the MFP 100 performs the copier function, the MFP 100 is in a copier operating mode. When the MFP 100 performs the printer function, the MFP 100 is in a printer operating mode. Similarly, when the MFP 100 performs a scanner function, the MFP 100 is in a scanner operating mode. When the MFP 100 performs the facsimile function, the MFP 100 is in a facsimile operating mode.

Subsequently, the ASIC (2) 112 stores the power consumption obtained at step S206 or step S209 in the NVRAM 115 (step S210) and displays the power consumption on the display part 127b of the operation part 127, the display part 17b being a user interface (step S211). The operation of step S210 may be performed by an NVRAM read/write part 112g of the ASIC (2) 112 of the controller 110. The operation of step S211 may be performed by an operation part control unit 112i of the ASIC (2) 112 of the controller 110. When displaying the power consumption on the display part 127b at step S211, a display indication which indicates the displayed power consumption is either the power consumption computed based on the power consumption currently measured (step S206) or the estimated power consumption based on the past experimental value (step S209) may be displayed simultaneously.

Subsequently, the presence of a power supply stop request to the electric power supply which is started at step S201 is checked (step S212). The operation of step S212 may be performed by a power supply ON/OFF determining part 112e of the ASIC (2) 112 of the controller 110 as shown in FIG. 11. When there is a power supply stop request in step S212, a power supply stop process is performed (step S213). Then, the process of FIG. 3 is terminated. The operation of step S213 may be performed by the power supply ON/OFF determining part 112e of the ASIC (2) 112 of the controller 110.

On the other hand, when there is no power supply stop request in step S212, the ASIC (2) 112 reads the power consumption (stored at step S210) from the NVRAM 115 (step S214). The operation of step S214 may be performed by the NVRAM read/write part 112g of the ASIC (2) 112 of the controller 110 as shown in FIG. 11.

Subsequently, the predetermined function of the power consumption read at step S214 is determined (determination of the operating mode) (step S215). Next, the ASIC (2) 112 reads out a target range table stored in the NAND type flash memory 116 (step S216).

The predetermined function of the power consumption read at step S214 is the predetermined function used as the basis of the computed power consumption when the power consumption read at step S214 is the same as that computed at step S206. When the power consumption read at step S214 is the same as that estimated at step S209, it is the predetermined function used as the basis of the estimated power consumption.

By associating with the power consumption the predetermined function which is used as the basis of the computed power consumption or the estimated power consumption and writing the predetermined function in the NVRAM 115, simultaneously when the power consumption is stored in the NVRAM 115 at step S210, the predetermined function of the power consumption can be determined at step S215. The operation of step S215 may be performed by an operating mode determining part 112*f* of the ASIC (2) 112 of the controller 110 as shown in FIG. 11. The operation of step S216 may be performed by an NAND (table) read part 112*h* of the ASIC (2) 112 of the controller 110 as shown in FIG. 11.

Subsequently, the ASIC (2) 112 acquires a target range of the power consumption for the predetermined function based on the predetermined function (the operating mode) and the target range table, and compares the acquired target range and the power consumption read from the NVRAM 115. Based on the comparison result, the ASIC (2) 112 determines the ON/OFF state of the measuring mode, i.e., determines whether the power consumption is measured by the power measuring module 160. Based on the result of the determination, the ASIC (2) 112 determines the set value of the current measuring mode stored in the DRAM 114 (step S217). The operation of step S217 may be performed by the measuring mode selecting part 112*a* of the ASIC (2) 112 of the controller 110 as shown in FIG. 11. The details of the determination and the selection of the set value of the measuring mode at the step S217 will be described below with reference to FIGS. 4A-4C. By performing these steps S214 to S217, the ASIC (2) 112 of the controller 110 functions as a measuring mode selecting unit that selects one of a measuring mode in which electric power is supplied to the power measuring module 160 and a non-measurement mode in which electric power is not supplied to the power measuring module 160.

After the step S217 is performed, the control is returned to the step S203 at which the set value of the current measuring mode is determined.

FIGS. 4A-4C are diagrams showing examples of the target range table used at the determination at the step S217. In the example of each table of FIGS. 4A-4C, the operating mode (or the predetermined function) is indicated at the top row, and the reference value of the power consumption which is beforehand determined for each operating mode (for each of the predetermined functions) is indicated at the middle row.

As shown in FIGS. 4A, 4B and 4C, the operating mode (the predetermined function) includes "copier" (copier operating mode), "printer" (printer operating mode), "scanner" (scanner operating mode), and "facsimile" (facsimile operating mode). As shown in FIGS. 4A, 4B and 4C, respective reference values of the power consumption for the copier operating mode (copier function), the printer operating mode (printer function), the scanner operating mode (scanner function), and the facsimile operating mode (facsimile function) are indicated by A (Wh), B (Wh), C (Wh), and D (Wh). It is assumed that each reference value indicates a reference value of the power consumption of the MFP 100 per one recording sheet when the MFP 100 performs the predetermined function of the MFP with the predetermined paper size, the predetermined resolution, and the predetermined recording sheet direction being used.

As shown in FIGS. 4A, 4B and 4C, a target range of the power consumption based on the reference value in the middle row of each table is indicated at the bottom row of each table. The "measured value" indicated at the bottom row of each table is the power consumption computed at the step S206 by the ASIC (2) 112 (which functions as the power consumption computing unit) when electric power is supplied to the power measuring module 160. When electric supply is not supplied to the power measuring module 160, the "measured value" indicated at the bottom row is the power consumption estimated at the step S209 by the ASIC (2) 112 (which functions as the power consumption estimating unit. These power consumption values may be collectively referred to as the computed or estimated power consumption.

At the bottom row of the table of FIG. 4A, the formula "measured value=reference value" is indicated as the target range. It is assumed that the "reference value" in this case is the value which is obtained by multiplying the number of recording sheets for execution of the predetermined function used as the basis of computation or estimation of the computed or estimated power consumption to the original reference value in the table. However, the present disclosure is not limited to this example. The reference value may be obtained through the correction which is suitably performed according to the conditions (a paper size, a resolution, and a recording sheet direction) with respect to execution of the predetermined function.

When the example of FIG. 4A is used, if the power consumption computed or estimated is equal to the reference value, according to the formula "measured value=reference value", the measuring mode is set in an OFF state. If the power consumption computed or estimated is not equal to the reference value, the measuring mode is set in an ON state and the power measuring module 160 is caused to measure the power consumption.

For example, when the conditions for execution of the predetermined function by the MFP are in accordance with the predetermined paper size, the predetermined resolution, and the predetermined recording sheet direction, respectively, there is a possibility that the power consumption computed or estimated is equal to the reference value (measured value=reference value). On the other hand, when the conditions for execution of the predetermined function by the MFP are not in accordance with the predetermined paper size, the predetermined resolution or the predetermined recording sheet direction, there is a high possibility that the power consumption computed or estimated is not equal to the reference value (measured value not equal to reference value). There may also be a case in which the power consumption computed or estimated is not equal to the reference value (measured value not equal to reference value) due to other conditions, such as environmental changes (temperature, humidity, etc.) or secular changes of the MFP.

In the case of FIG. 4A, when the power consumption computed or estimated is equal to the reference value (within the target range), the measuring mode is turned OFF to set the power measuring module 160 in a non-operating state in order to reduce the power consumption by the power measuring module 160 without measuring the power consumption. On the other hand, when the power consumption computed or estimated is not equal to the reference value (beyond the target range), the measuring mode is turned ON to set the power measuring module 160 in an operating state so that the power consumption is measured and the exact power consumption value is displayed to the user.

Next, at the bottom row of the table of FIG. 4B, the formula "measured value<reference value" is indicated. When the example of FIG. 4B is used, if the measured value is less than the reference value (within the target range), according to the formula "measured value<reference value", the measuring mode is set in an OFF state. If the measured value is above the reference value (beyond the target range), the measuring mode is set in an ON state and the power consumption is measured by the power measuring module 160.

For example, when the conditions for execution of the predetermined function by the MFP are not in agreement with the predetermined paper size, the predetermined resolution or the predetermined recording sheet direction, a case in which the measured value is above the reference value (measured value>=reference value), and a case in which the measured value is under the reference value (measured value<reference value) are conceivable. There may also be a case in which the measured value is above the reference value (measured value>=reference value) due to other conditions, such as environmental changes (temperature, humidity, etc.) or secular changes of the MFP.

In the case of FIG. 4B, when the power consumption computed or estimated is less than the reference value (measured value<reference value) (within the target range), the measuring mode is turned OFF to set the power measuring module 160 in a non-operating state in order to reduce the power consumption by the power measuring module 160 without measuring the power consumption. On the other hand, when the power consumption computed or estimated is above the reference value (beyond the target range), the measuring mode is turned ON to set the power measuring module 160 in an operating state so that the power consumption is measured and the exact power consumption value is displayed to the user.

Next, at the bottom row of the table of FIG. 4C, the formula "|measured value-reference value|<=0.2 Wh" is indicated. That is, when the absolute value of the difference between the measured value and the reference value is 0.2 Wh or less, the measuring mode is set in an OFF state. On the other hand, when the absolute value of this difference is over 0.2 Wh, the measuring mode is set in an ON state. Hereafter, the threshold or tolerance (0.2 Wh in the example of FIG. 4C) which is the absolute value of the difference between the measured value and the reference value will be called a "difference threshold".

For example, when the conditions for execution of the predetermined function are in agreement with the predetermined paper size, the predetermined resolution, and the predetermined recording sheet direction, respectively, there is a possibility that the measured value is nearly equal to the reference value (measured value-reference value|<=0.2 Wh). On the other hand, when the conditions for execution of the predetermined function are not in agreement with the predetermined paper size, the predetermined resolution or the predetermined recording sheet direction, a difference between the measured value and the reference value is large and there is a high possibility of "|measured value-reference value|>0.2 Wh". There may also be a case in which a difference between the measured value and the reference value is large due to other conditions, such as environmental changes (temperature, humidity, etc.) or secular changes of the MFP, and there is a high possibility of "|measured value-reference value|>0.2 Wh".

In the case of FIG. 4C, when the power consumption computed or estimated is nearly equal to the reference value and the difference thereof is less than the predetermined value (within the target range), the measuring mode is turned OFF and the power measuring module 160 is set in a non-operating state (not to measure the power consumption) in order to reduce the power consumption by the power measuring module 160. On the other hand, when the power consumption computed or estimated is greatly different from the reference value and the difference thereof is over the predetermined value (beyond the target range), the measuring mode is turned ON and the power measuring module 160 is set in an operating state (to measure the power consumption) so that the exact power consumption value is displayed to the user.

Thus, according to this embodiment, when the power consumption computed or estimated is beyond the target range of the reference values, the power measuring module 160 is set in an operating state, and the exact power consumption value is displayed to the user so that a user's attention is called. On the other hand, when the power consumption computed or estimated is within the target range of the reference values, the power measuring module 160 is set in a non-operating state to reduce the power consumption of the MFP.

In the above-mentioned embodiment, the reference value for the comparison at step S217 with the power consumption computed or estimated is obtained from the original reference value multiplied by the number of sheets for execution of the predetermined function used as the basis of computation or estimation of the power consumption. However, the present disclosure is not limited to this embodiment. Alternatively, the reference value for the comparison at step S217 with the power consumption computed or estimated may be equivalent to the original reference value. As described above with reference to FIGS. 4A-4C, the original reference value is the power consumption value for processing of a single recording sheet. If two or more recording sheets are processed for execution of the predetermined function used as the basis of computation or estimation of the power consumption computed or estimated and the reference value is equivalent to the original reference value, the possibility that the computed or estimated power consumption is outside the target range in any of the cases of FIGS. 4A-4C is high. In that case, the measuring mode is set to ON, the power measuring module 160 is set in an operating state to measure the power consumption, and the exact power consumption value is displayed to the user. On the other hand, if a single recording sheet is processed for execution of the predetermined function used as the basis of computation or estimation of the power consumption computed or estimated, the computed or estimated power consumption may be within the target range in any of the cases of FIGS. 4A-4C. In that case, the measuring mode is set to OFF, the power measuring module 160 is set in a non-operating state, and the power consumption can be reduced.

Next, the MFP 100A of the second embodiment of the present disclosure will be described.

In the process of power consumption computation and display sequence in the previously described first embodiment, the target range of power consumption which is defined beforehand is stored in the NAND type flash memory 116. However, there may be a case in which the variation in the measured values of the power consumption in the environment of the installation place of the MFP is large and the power measuring module 160 is frequently turned ON. Even in such a case, the target range cannot be changed and the frequency cannot be lowered.

To eliminate the problem, in the second embodiment, the user is enabled to change the difference threshold (0.2 Wh in the example of FIG. 4C) of the target range table shown in FIG. 4C through the operation input part 127a of the operation part 127. The second embodiment of the present disclosure will be described.

In the second embodiment, after the initial setting of the measuring mode is performed, the setting of the difference threshold by the operation input part 127a of the operation part 127 can be performed, and, even after the determination of the measuring mode ON/OFF state is performed, the difference threshold can be changed. Hence, the frequency that the power measuring module 160 is turned ON can be adjusted, and it is possible to prevent the increasing of the power consumption by the power measuring module 160.

Figure 5:
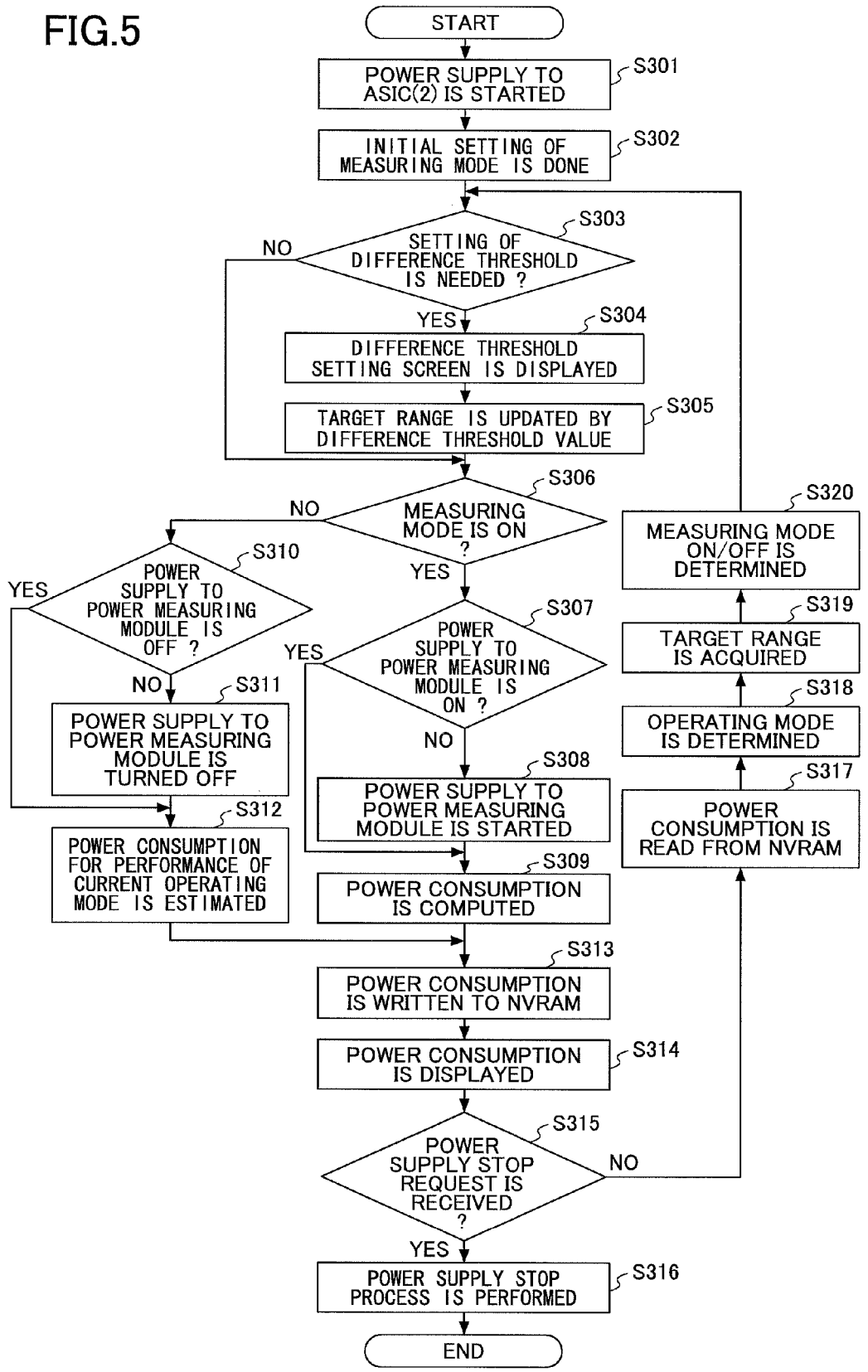
FIG. 5 is a flowchart for explaining a process of power consumption computation and display sequence performed by the MFP of the second embodiment.
Figure 12:
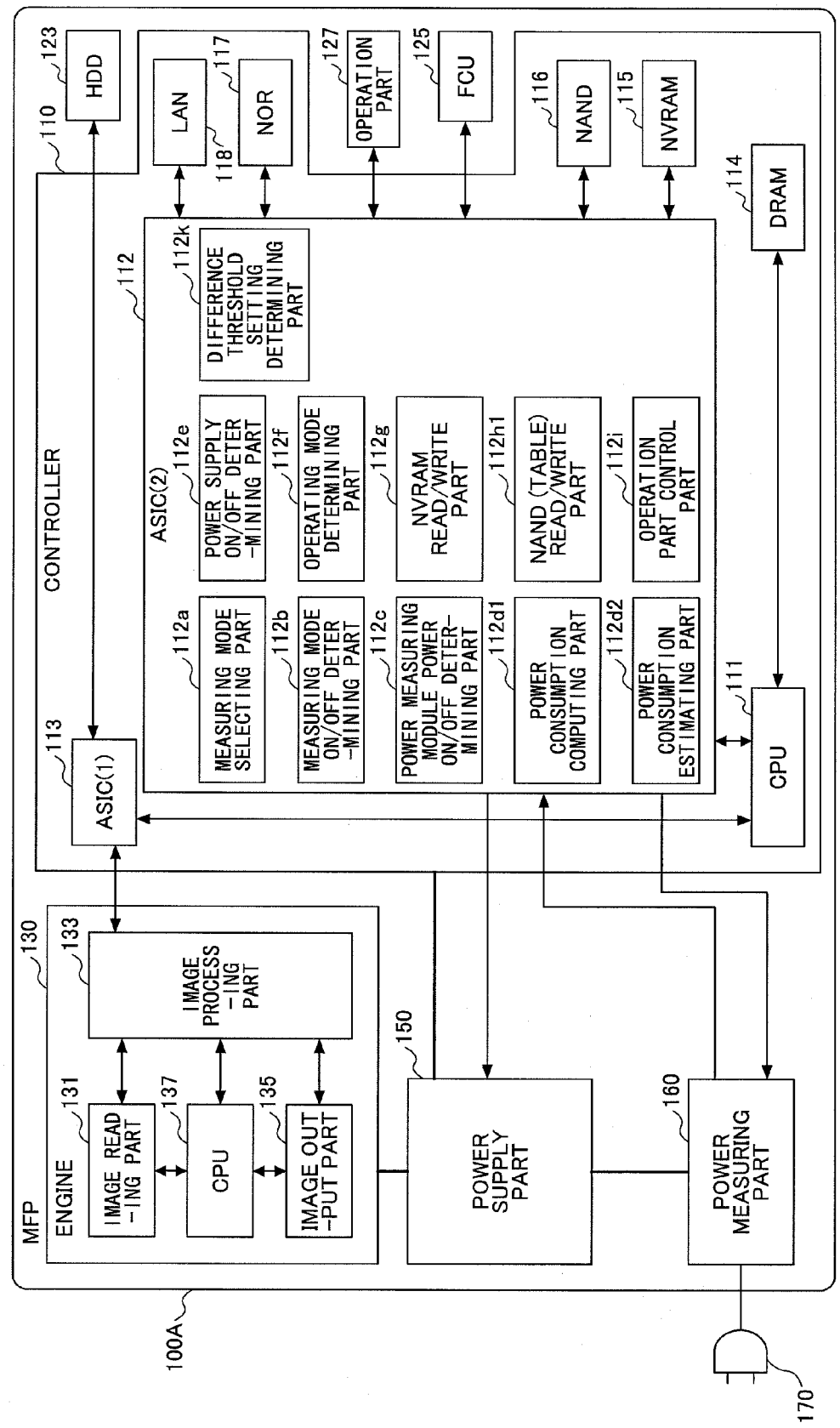
FIG. 12 is a block diagram showing the functional composition of an ASIC (2) in the MFP of the second embodiment.

FIG. 5 is a flowchart for explaining a process of power consumption computation and display sequence performed by the MFP 100A of this embodiment. FIG. 12 is a block diagram showing the functional composition of the ASIC (2) in the MFP 100A of this embodiment.

In the flowchart of FIG. 5, after the initial setting of the measuring mode is performed (step S302), the necessity of the setting of a difference threshold is determined (step S303). This determination can be performed by displaying a screen that requests a user to input the setting of a difference threshold, on the display part 127b of the operation part 127, and receiving an entry of the difference threshold that is input on the operation input part 127a of the operation part 127 by the user in response to this request. The operation of step S303 may be performed by a difference threshold setting determining part 112k and an operation part control unit 112i of the ASIC (2) 112 of the controller 110 as shown in FIG. 12.

When the setting of a difference threshold is needed in the step S303, the ASIC (2) 112 of the controller 110 displays the setting screen of a difference threshold on the display part 127b and receives the difference threshold which is input by the user on the operation input part 127a (step S304). The ASIC (2) 112 rewrites the target range table stored in the NAND type flash memory 116 by the received difference threshold (step S305). The control is transferred to step S306. The operation of step S304 may be performed by the difference threshold setting determining part 112k and the operation part control unit 112i of the ASIC (2) 112 of the controller 110 as shown in FIG. 12. The operation of step S305 may be performed by an NAND (table) read/write part 112h1 of the ASIC (2) 112 of the controller 110 as shown in FIG. 12.

On the other hand, when the setting of a difference threshold is not needed in the step S303, the ASIC (2) 112 of the controller 110 does not display the setting screen of a difference threshold on the display part 127b. The control is transferred directly to step S306.

Also, after the determination and setting of the measuring mode ON/OFF state is performed at step S320, the control of the ASIC (2) 112 of the controller 110 is returned to the step S303, and the necessity of the setting of a difference threshold is determined again.

Except for the above-described steps S303 to S305, the procedure of steps S301, S302 and S306 to S320 in the process of FIG. 5 is essentially the same as that of steps S201, S202, S203 to S217 in the process of FIG. 3, and a description thereof will be omitted. The parts 112a to 112g and 112i in the MFP 100A of this embodiment shown in FIG. 12 are the same as the parts 112a to 112g and 112i in the MFP 100 of the first embodiment shown in FIG. 11, respectively, and a description thereof will be omitted.

Figure 6A:
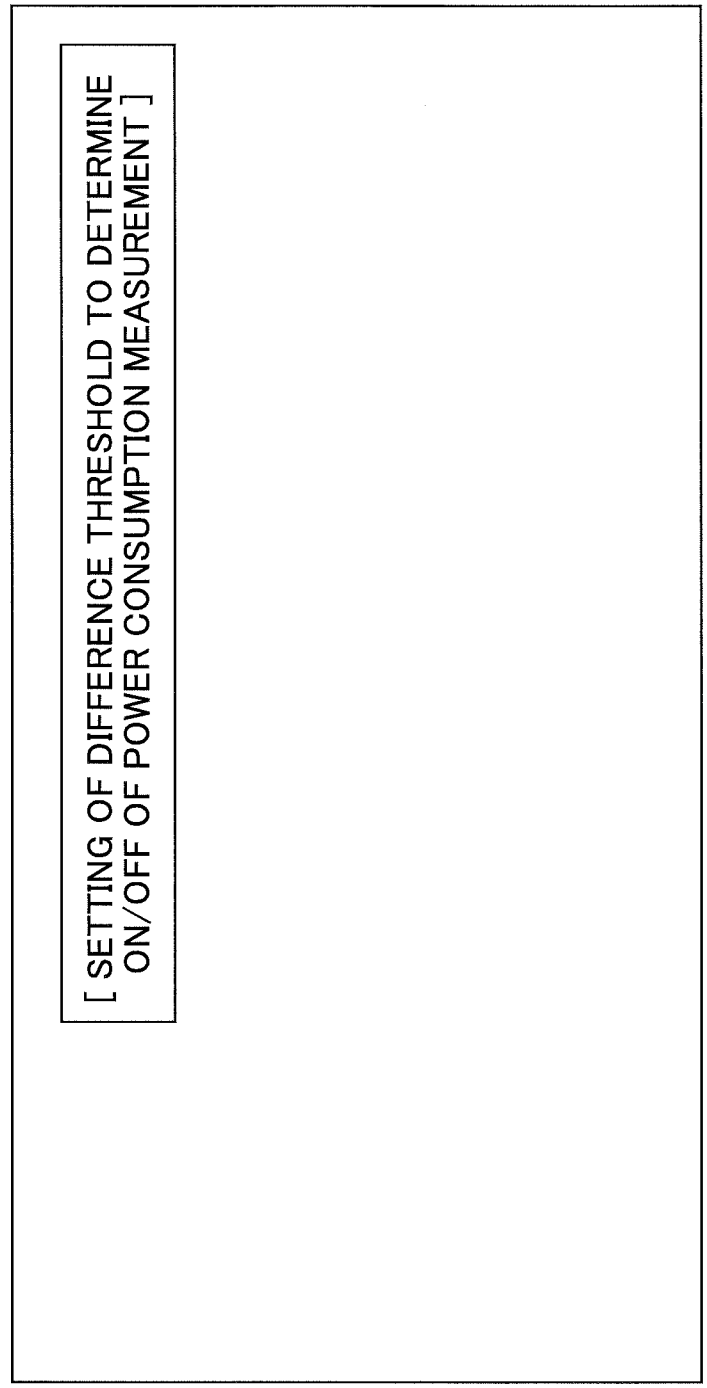
FIG. 6A and FIG. 6B are diagrams showing examples of display screens for setting a difference threshold in the MFP of the second embodiment.
Figure 6B:
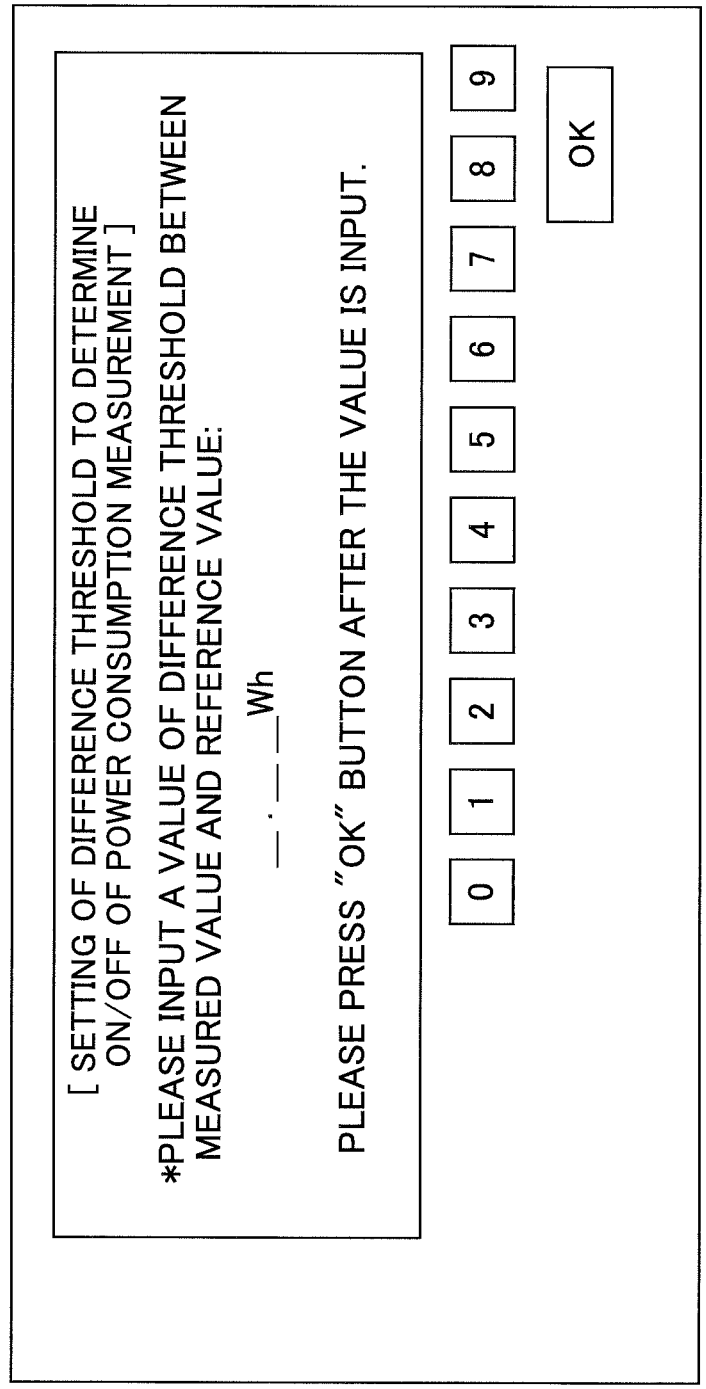

FIGS. 6A and 6B show examples of display screens displayed on the display part 127b of the operation part 127 for setting a difference threshold. FIG. 6A shows an example of a setting inquiry screen of a difference threshold displayed on the display part 127b at the step S303. A button indicating "setting of difference threshold to determine ON/OFF of power consumption measurement" is displayed on this screen. It is assumed that a touch-panel type LCD (liquid crystal display) is used as the operation part 127 in this embodiment. In this case, when the user pushes the button "setting of difference threshold to determine ON/OFF of power consumption measurement" within a predetermined time, the ASIC (2) 112 of the controller 110 determines that the setting of a difference threshold is needed (step S303-YES). When the button has not been pushed over the predetermined time, it is determined that the setting of a difference threshold is not needed (step S303-NO).

FIG. 6B shows an example of the setting screen of the difference threshold displayed on the display part 127b of the operation part 127 at the step S304. When the button "setting of difference threshold to determine ON/OFF of power consumption measurement" as in FIG. 6A is pushed within the predetermined time and the ASIC (2) 112 of the controller 110 determines that the setting of a difference threshold is needed (step S303-YES), the screen as in FIG. 6B is displayed at the step S304. The user can input a set value X of a new difference threshold by using the numeric keys displayed on this screen, and can finalize the input set value X of the new difference threshold by pressing the "OK" button.

By this embodiment, the user is enabled to change the difference threshold (0.2 Wh in the example of FIG. 4C) that defines the target range in the bottom row of the target range table of FIG. 4C by performing the setting operation. For example, in a case in which the variation in the computation value of the power consumption in the environment of the installation place of the MFP 100A is large and the power measuring module 160 is very frequently turned ON, the user can change the difference threshold through the operation part 127 to change the target range.

If the variation in the computation value of the power consumption in the environment of the installation place of the MFP 100A is large, the frequency in which the measured value (the power consumption) is outside the target range (|measured value-reference value|>0.2 Wh) becomes high. As a result, the frequency in which the result of the measuring mode ON/OFF determination of the step S320 is set to "measuring mode ON" increases, and the frequency in which electric power is supplied to the power measuring module 160 increases. In such a case, the user is enabled to set up a value 'X' Wh of a new difference threshold (which is larger than the current value 0.2 Wh) on the setting screen (FIG. 6B) of the difference threshold displayed on the display part 127b at the step S304.

Consequently, even in the case in which the variation in the computation value of the power consumption in the environment of the installation place of the MFP 100A is large, the frequency in which the measured value (the power consumption) is beyond the target range (|measured value-reference value|>XWh) can be lowered. The frequency in which the result of the measuring mode ON/OFF determination of the step S320 is the "measuring mode ON" can be lowered, and the frequency in which electric power is supplied to the power measuring module 160 can be lowered. As a result, the power consumption by the power measuring module 160 can be reduced. The user can determine arbitrarily the set value X of a new difference threshold. For this reason, inconsistency between the power consumption reduction effect and the displaying of the exact power consumption value to the user can be suitably eliminated by adjusting the set value X.

Next, the MFP 100B of the third embodiment of the present disclosure will be described.

In the first embodiment, the ON/OFF determination and setting of the measuring mode is performed (step S217 of FIG. 3) and the ON/OFF of the measuring mode is switched automatically. Therefore, the measuring mode cannot be set in an ON state or in an OFF state invariably.

In this embodiment, selection of ON/OFF (valid/invalid) of the function (automatic determination function) of the measuring mode ON/OFF determination and setting is enabled, and setting of the measuring mode in an ON state or in an OFF state invariably is enabled through the operation part 127.

Next, the process of power consumption computation and display sequence performed by the MFP 100B of the third embodiment will be described. In the MFP 100B of this embodiment, before the determination of "measuring mode ON" (step S404 in FIG. 7) is performed, steps S403, S403A and S403B are performed. At step S403, the user selects ON/OFF (valid/invalid) of the function (automatic determination function) of the measuring mode ON/OFF determination and setting through the operation part 127. The selected result is stored in the DRAM 114. At step S403A, the selected result is checked. If the selected result is "automatic determination function ON (valid)", the control is transferred to step S404. If the selected result is "automatic determination function OFF (invalid)", the control is transferred to step S403B.

Figure 8A:
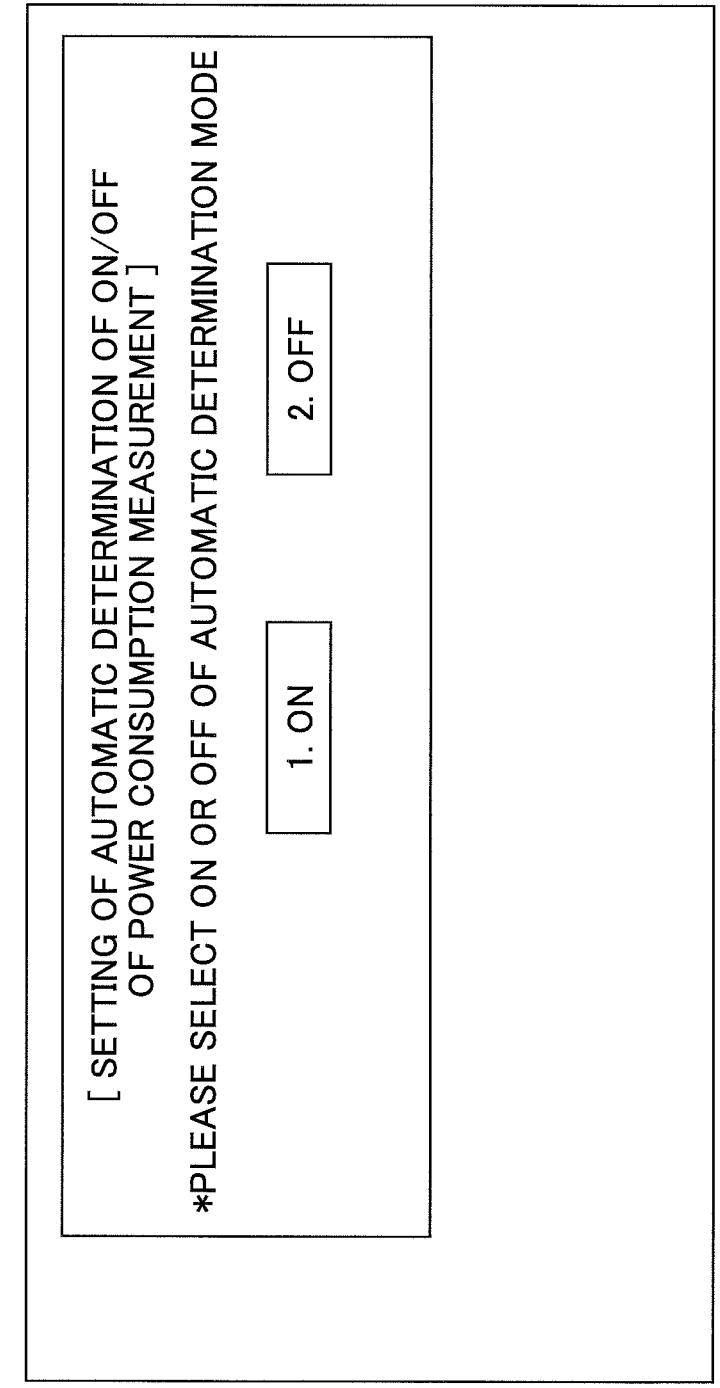
FIG. 8A and FIG. 8B are diagrams showing an example of an input screen of the necessity of automatic determining of measuring mode ON/OFF in the MFP of the third embodiment, and an example of a setting screen of the measuring mode ON/OFF.
Figure 8B:
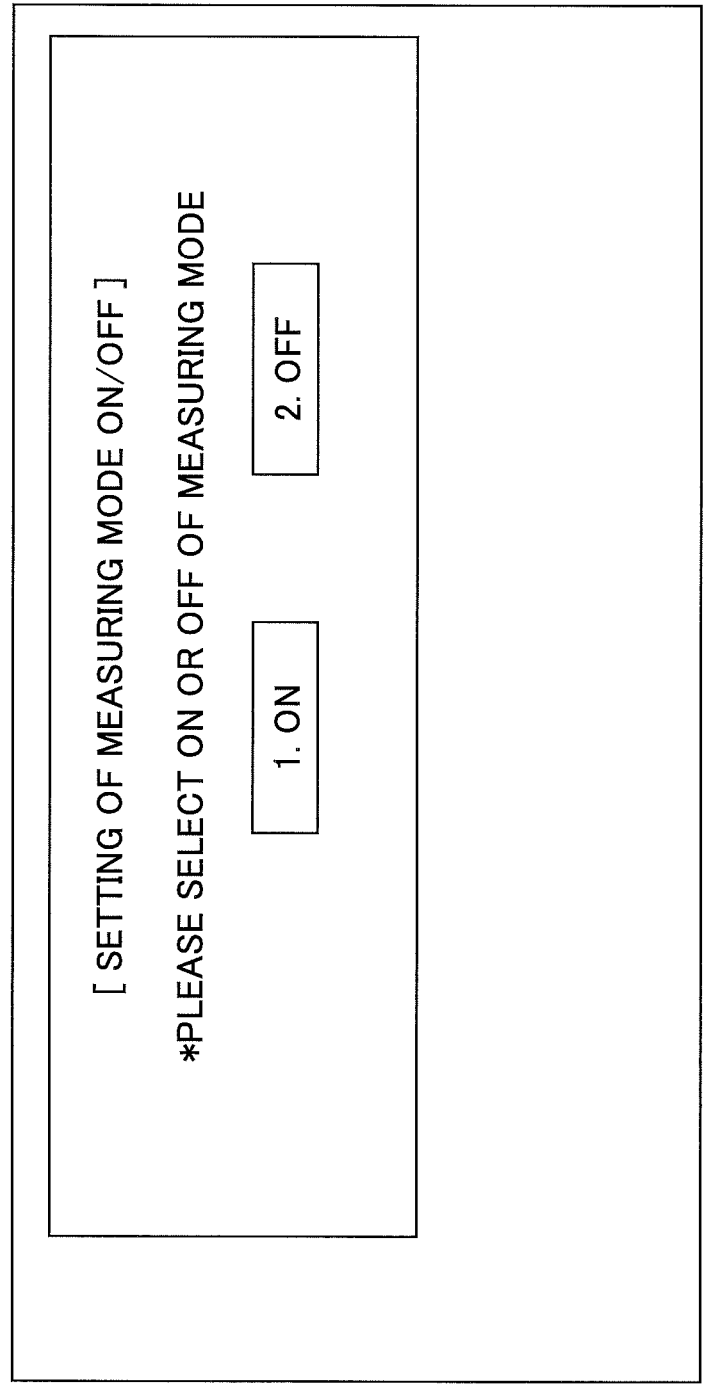

At step S403B, the setting screen of measuring mode ON/OFF as shown in FIG. 8B is displayed on the display part 127b of the operation part 127, the entry content (measuring mode ON or not) input by the user is received and stored in the DRAM 114. Hence, the automatic determination function can be turned OFF (invalid) and the measuring mode can be set to ON invariably, the power measuring module 160 can always be operated, and the power consumption can be continuously measured. As a result, a time transition of the power consumption based on the actual measurement of the power consumption at this time can be displayed. Conversely, it is also possible to turn OFF the measuring mode invariably and set the power measuring module 160 in a non-operating state invariably. In this case, the power consumption by the power measuring module 160 can be reduced, and the power consumption of the whole MFP 100B can be reduced.

Figure 7:
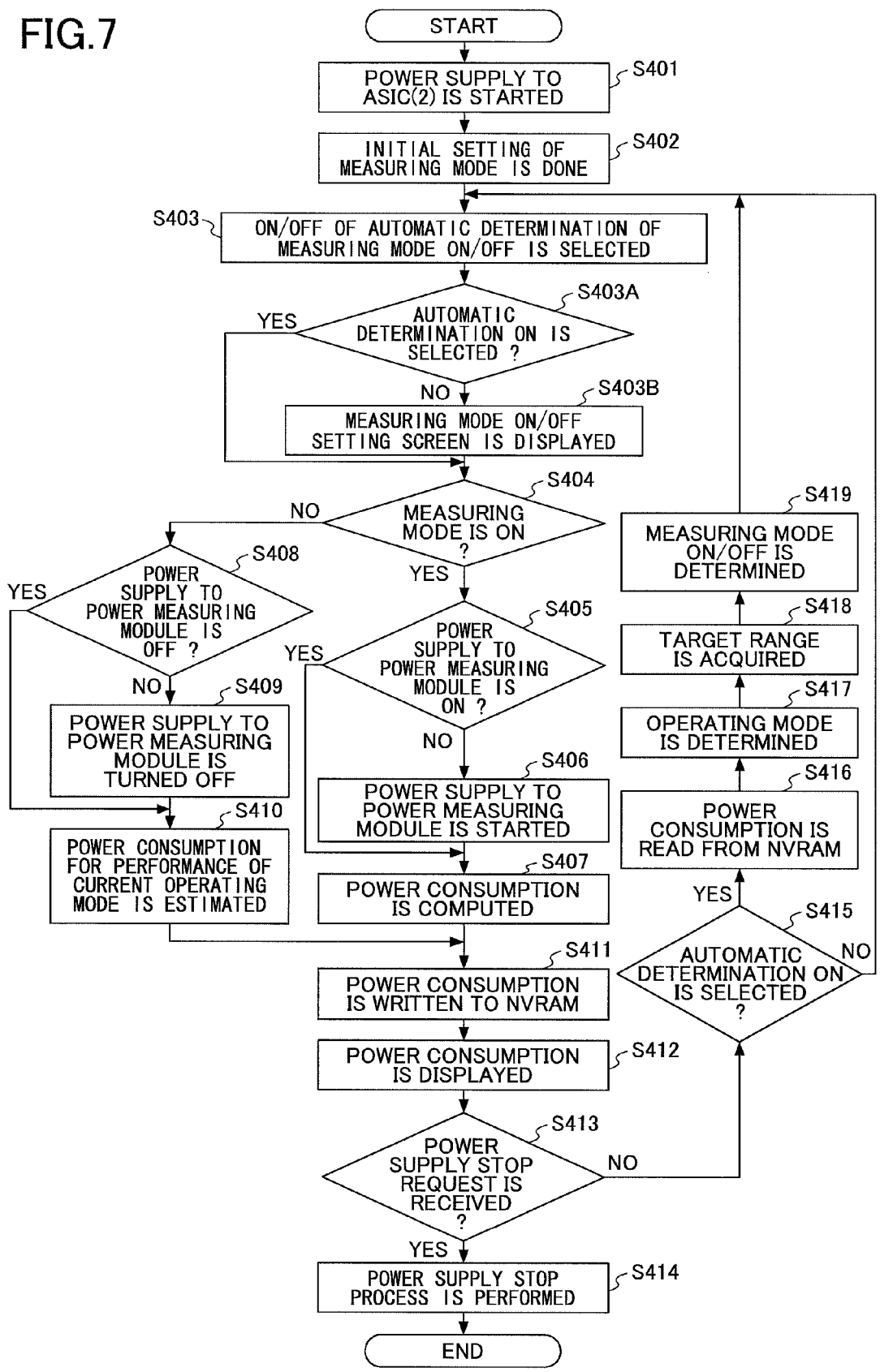
FIG. 7 is a flowchart for explaining a process of power consumption computation and display sequence performed by the MFP of the third embodiment.
Figure 13:
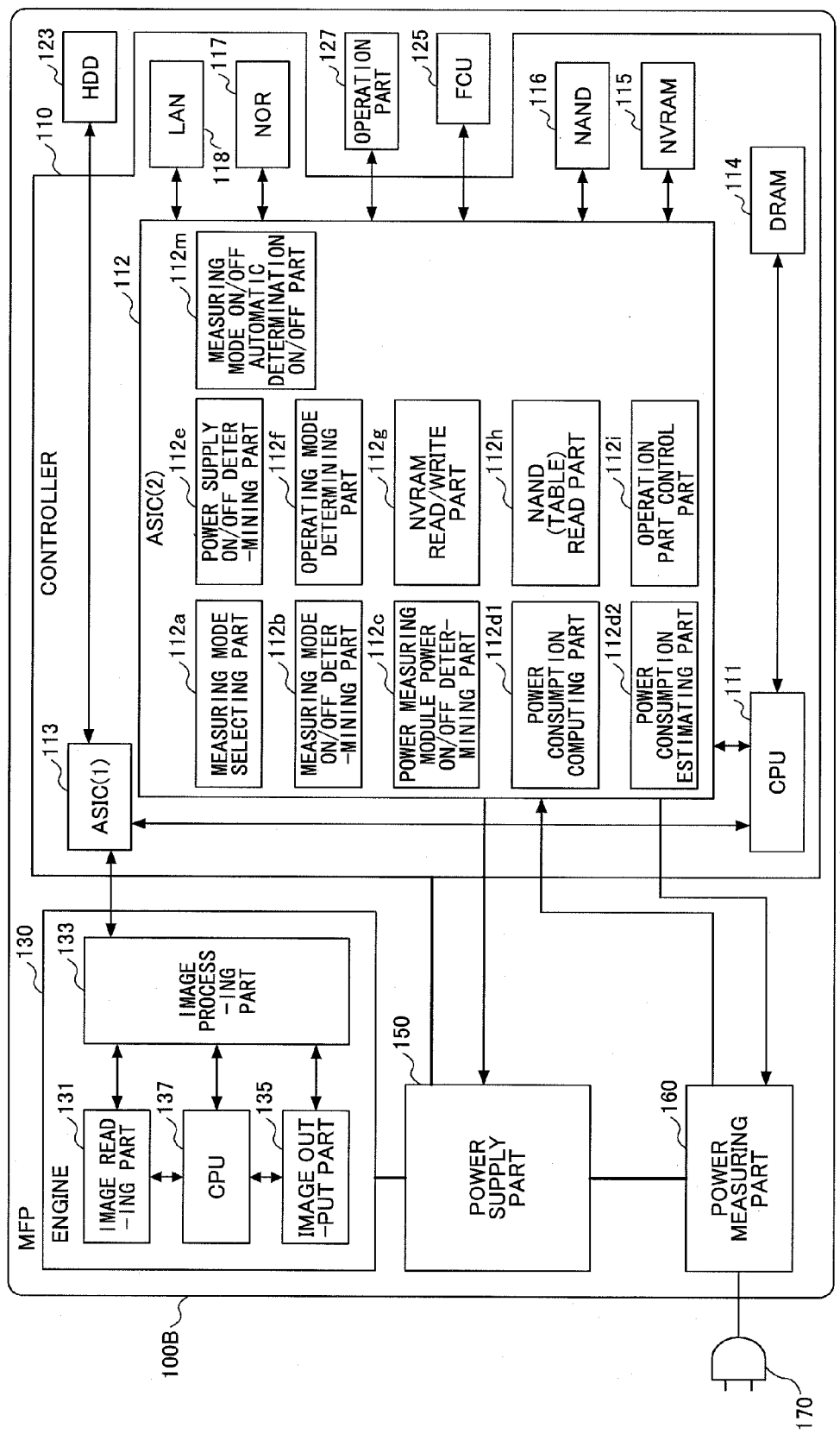
FIG. 13 is a block diagram showing the functional composition of an ASIC (2) in the MFP of the third embodiment.

FIG. 7 is a flowchart for explaining a process of power consumption computation and display sequence performed by the MFP 100B of this embodiment. FIG. 13 is a block diagram showing the functional composition of the ASIC (2) 112 in the MFP 100B of this embodiment.

In the flowchart of FIG. 7, before the determination of the measuring mode ON (step S404) is performed, the screen that requests a user to input the necessity of an automatic determination function is displayed on the display part 127b of the operation part 127. The user's input in response to this request is received by the operation input part 127a of the operation part 127, the setting screen of the measuring mode is further displayed if needed, and the user's input is received and stored in the DRAM 114 (steps S403, S403A, S403B). The operation of the steps S403, S403A and S403B may be performed by the measuring mode ON/OFF automatic determination ON/OFF part 112m, the measuring mode selecting part 112a, and the operation part control unit 112i of the ASIC (2) 112 of the controller 110 as shown in FIG. 13.

After the power consumption is displayed on the operation part 127 (step S412) and it is detected that there is no power supply stop request (step S413), it is determined whether the automatic determination function is set to ON (step S415). When the automatic determination function is set to ON (step S415), the procedure of the measuring mode ON/OFF determination and setting at steps S416 to S420 is performed, and the control is returned to the step S403 and the selection of the automatic determination function ON/OFF is performed again. The operation of the step S415 may be performed by the measuring mode ON/OFF automatic determination ON/OFF part 112m of the ASIC (2) 112 of the controller 110 as shown in FIG. 13.

On the other hand, when the automatic determination function is set to OFF (step S415), the control is returned directly to the step S403 and the selection of the automatic determination function ON/OFF is performed. By performing the step S415, the ASIC (2) 112 of the controller 110 functions as a unit that selects the ON/OFF of the measuring mode selecting unit.

Except for the above-mentioned steps S403, S403A, S403B and S415, the procedure of steps S401, S402, S404 to S414 and S416 to S419 in the process of FIG. 7 is essentially the same as that of steps S201, S202, S203 to S213 and S214 to S217 in the process of FIG. 3, and a description thereof will be omitted. The parts 112a to 112i in the MFP 100B of the third embodiment in FIG. 13 are the same as the parts 112a to 112i in the MFP 100 of the first embodiment in FIG. 11, and a description thereof will be omitted.

FIG. 8A shows an example of an input screen for checking the necessity of the automatic determination function of the measuring mode ON/OFF displayed on the display part 127b of the operation part 127 at the step S403. In the screen of FIG. 8A, two buttons "1. ON" and "2. OFF" are indicated with a message indicating "please select ON or OFF of automatic determination mode". When a user presses one of these buttons, the ON/OFF of the automatic determination function can be selected.

FIG. 8B shows an example of the setting screen of the measuring mode ON/OFF displayed on the display part 127b of the operation part 127 at the step S403B. The two buttons "1. ON" and "2. OFF" are displayed on this screen with a message indicating "please select ON or OFF". When a user presses one of these buttons, the ON/OFF of the measuring mode can be selected.

According to the third embodiment, the user can set up the ON/OFF of the automatic determination function and the ON/OFF of the measuring mode arbitrarily. Therefore, according to the occasional need of the user, the automatic determination function of the measuring mode ON/OFF can be set to ON invariably. As a result, regardless of the power consumption value (estimated or computed based on the current measurement value), the power consumption based on the current measurement value of the power consumption of the MFP 100B can always be displayed. Or the automatic determination function of the measuring mode ON/OFF can also be set to in an OFF state. As a result, regardless of the power consumption value (estimated or computed based on the current measurement value), the power consumption by the power measuring module 160 can always be reduced by setting the power measuring module 160 in a non-operating state invariably, and the power consumption of the MFP 100B can be decreased effectively.

Next, the image forming device of the fourth embodiment of the present disclosure will be described.

In this embodiment, the portion (AC power supply connection part) which extends from the commercial AC power supply to the power supply part 150 via the AC connector 170, such as a plug, is arranged into an exchangeable component in the MFP (FIG. 1) of the foregoing embodiments.

As shown in FIG. 9, the AC power supply connection part is a connecting portion of the MFP 100C that connects the connecting unit 170, such as a plug, and the MFP 100C and contains the receptacle (R1) provided in the MFP 100C for connection. In this case, as shown in FIG. 9, the connecting unit 170, such as a plug, is constructed to include a plug P1 to be inserted in an external power outlet, a plug (not illustrated) to be inserted in the receptacle R1 of the MFP 100C, and an electric wire W1 to connect these plugs.

In the fourth embodiment, two kinds of AC power supply connection parts are provided: an AC power supply connection part 162 with a power measuring module and an AC power supply connection part 162' without a power measuring module. Furthermore, one of the AC power supply connection parts 162 and 162' can be selected as the part actually used with the MFP 100C.

FIG. 9 is a block diagram showing the composition of the MFP 100C of this embodiment. As shown in FIG. 9, the MFP 100C is arranged so that either of the AC power supply connection parts 162 and 162' is usable as an exchangeable component in the MFP of FIG. 1.

Except for the AC power supply connection parts 162 and 162', the elements of the MFP 100C in FIG. 9 which are the same as corresponding elements of the MFP in FIG. 1 are designated by the same reference numerals, and a description thereof will be omitted.

It is assumed that the AC power supply connection part 162 containing the power measuring module has the same composition as that of the power measuring module 160 in the MFP of FIG. 1. It is assumed that the AC power supply connection part 162' containing no power measuring module is constructed to include a circuit which supplies electric power from the receptacle R1 directly to the power supply part 150.

Figure 10:
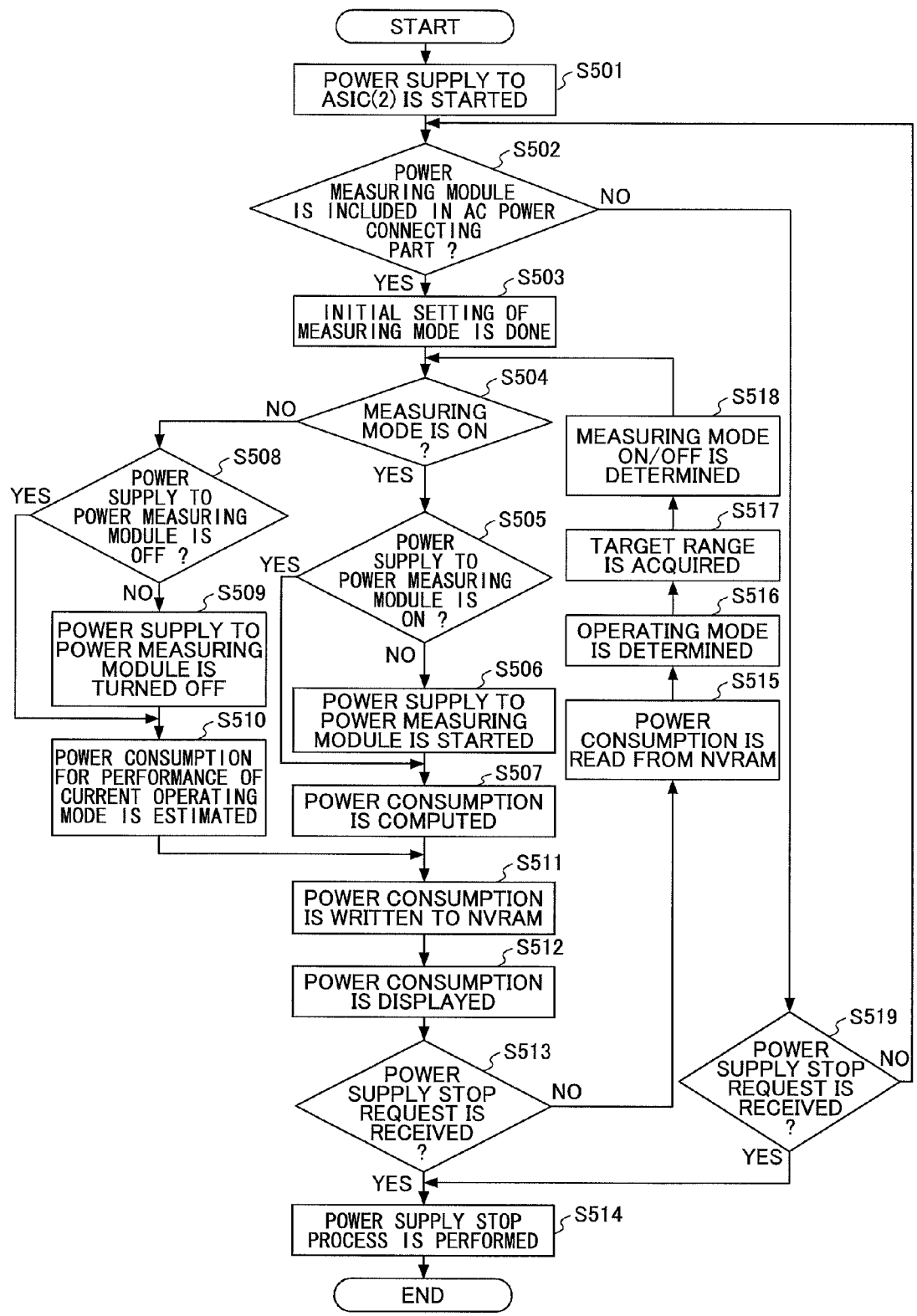
FIG. 10 is a flowchart for explaining a process of power consumption computation and display sequence performed by the MFP of the fourth embodiment.
Figure 14:
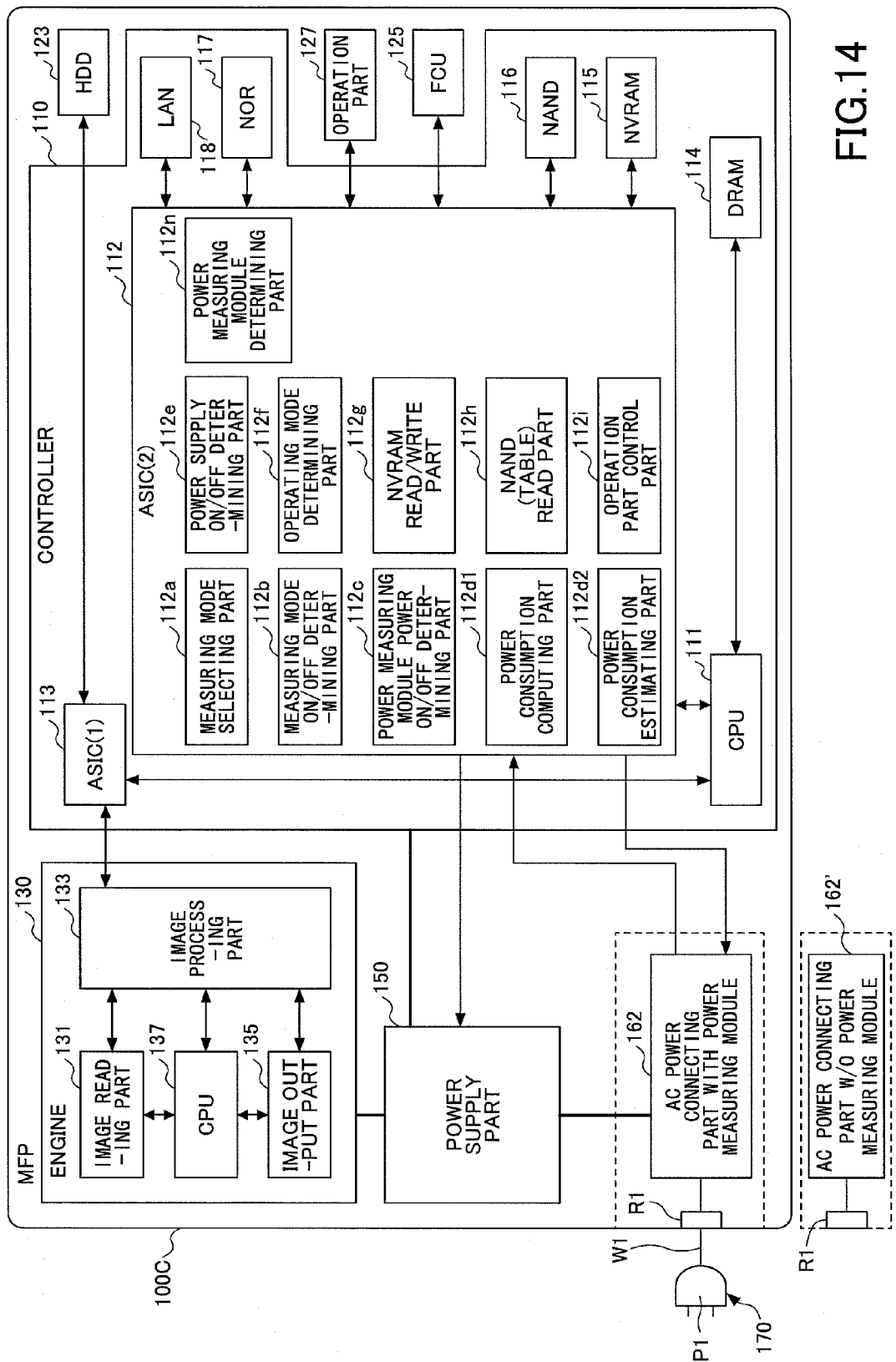
FIG. 14 is a block diagram showing the functional composition of an ASIC (2) in the MFP of the fourth embodiment.

FIG. 10 is a flowchart for explaining a process of power consumption computation and display sequence performed by the MFP 100C of this embodiment. FIG. 14 is a block diagram showing the functional composition of the ASIC (2) 112 in the MFP 100C of this embodiment.

The process of FIG. 10 is provided based on the process of FIG. 3 such that either of the AC power supply connection parts 162 and 162' can be used as an exchangeable component in the MFP 100C. The process of FIG. 10 differs from the process of FIG. 3 in that steps S502 and S519 are additionally performed in order to carry out the process of power consumption computation and display sequence with the use of the two AC power supply connection parts 162 and 162'.

Specifically, the procedure of steps S501 and S503 to S518 in the process of FIG. 10 are essentially the same as that of steps S201 and S202 to S217 in the process of FIG. 3, and a description thereof will be omitted. The parts 112a to 112i in the MFP 100C of this embodiment shown in FIG. 14 are the same as the parts 112a to 112i in the MFP 100 of the first embodiment shown in FIG. 11, respectively, and a description thereof will be omitted.

In the flowchart of FIG. 10, when the electric power supply to the ASIC (2) 112 of the controller 110 is started and the ASIC (2) 112 is in an operating state (step S501), the ASIC (2) 112 first checks the presence of a power measuring module (step S502). That is, it is detected which of the AC power supply connection parts 162 and 162' is currently used in the MFP 100C. The operation of step S502 may be performed by a power measuring module determining part 112n of the ASIC (2) 112 of the controller 110 as shown in FIG. 14.

A method of determining the kind of the currently attached AC power supply connection part at the step S502 will be described. For example, the ASIC (2) 112 of the controller 110 stores the device configuration information (the MFP 100C) in the NVRAM 115, and determines which of the AC power supply connection parts 162 and 162' is currently used in the MFP 100C, based on the device configuration information read from the NVRAM 115. Alternatively, when each of the AC power supply connection parts 162 and 162' is attached to the MFP 100C, each part outputs a presence signal indicating the presence of the power measuring module to the ASIC (2) 112. By receiving this signal, the ASIC (2) 112 may determine whether the AC power supply connection part currently attached to the MFP 100C has the power measuring module or not.

If the presence of the power measuring module 160 is detected at the step S502 and the power measuring module 160 is included in the AC power supply connection part 162 at the step S502, the process of power consumption computation and display sequence (steps S503 to S518) is performed. The procedure of power consumption computation and display sequence performed at this time in the process of FIG. 10 is essentially the same as the procedure of steps S202 to S217 in the process of FIG. 3, and a description thereof will be omitted.

On the other hand, if there is no power measuring module as a result of checking the presence of the power measuring module at the step S502 (i.e., if the AC power supply connection part 162' is attached), the control is transferred to step S519. In this case, the process of power consumption computation and display sequence (steps S503 to S518) is not performed. The process of power consumption computation and display sequence (steps S503 to S518) is skipped and the control is transferred to step S519. At the step S519, it is determined whether a power supply stop request is received.

When a power supply stop request is received at the step S519, the process of a power supply stop is performed (step S514), and the process of FIG. 10 is terminated. On the other hand, when no power supply stop request is received at the step S519, the control is returned to the step S502. The operation of step S519 may be performed by the power supply ON/OFF determining part 112e of the ASIC (2) 112 of the controller 110 as shown in FIG. 11.

In this embodiment, according to the need of a user, the AC power supply connecting device 162 containing the power measuring module may be attached to the MFP 100C, and the power consumed by the MFP can be measured by using the power measuring module, and the power consumption can be computed. On the other hand, if it is not necessary to measure the power consumed by the MFP and to compute the power consumption, the AC power supply connecting device 162' containing no power measuring module may be attached to the MFP 100C, and unnecessary power consumption can be eliminated. Therefore, user friendliness or improvement in convenience of the MFP can be increased.

Alternatively, any combination of two or more of the plurality of functions in the foregoing embodiments of the present disclosure (or the first through fourth embodiments) may be applied to the image forming device. For example, two or more of the plurality of functions, including the function to allow a user to set up a difference threshold, the function to allow a user to set up the necessity of a measuring mode ON/OFF automatic determination, and the function to allow a user to set up the presence of a power measuring module may be applied to the MFP of the first embodiment.

Next, the composition of the power supply measuring module 160 in each of the foregoing embodiments will be described with reference to FIG. 15.

Figure 15:
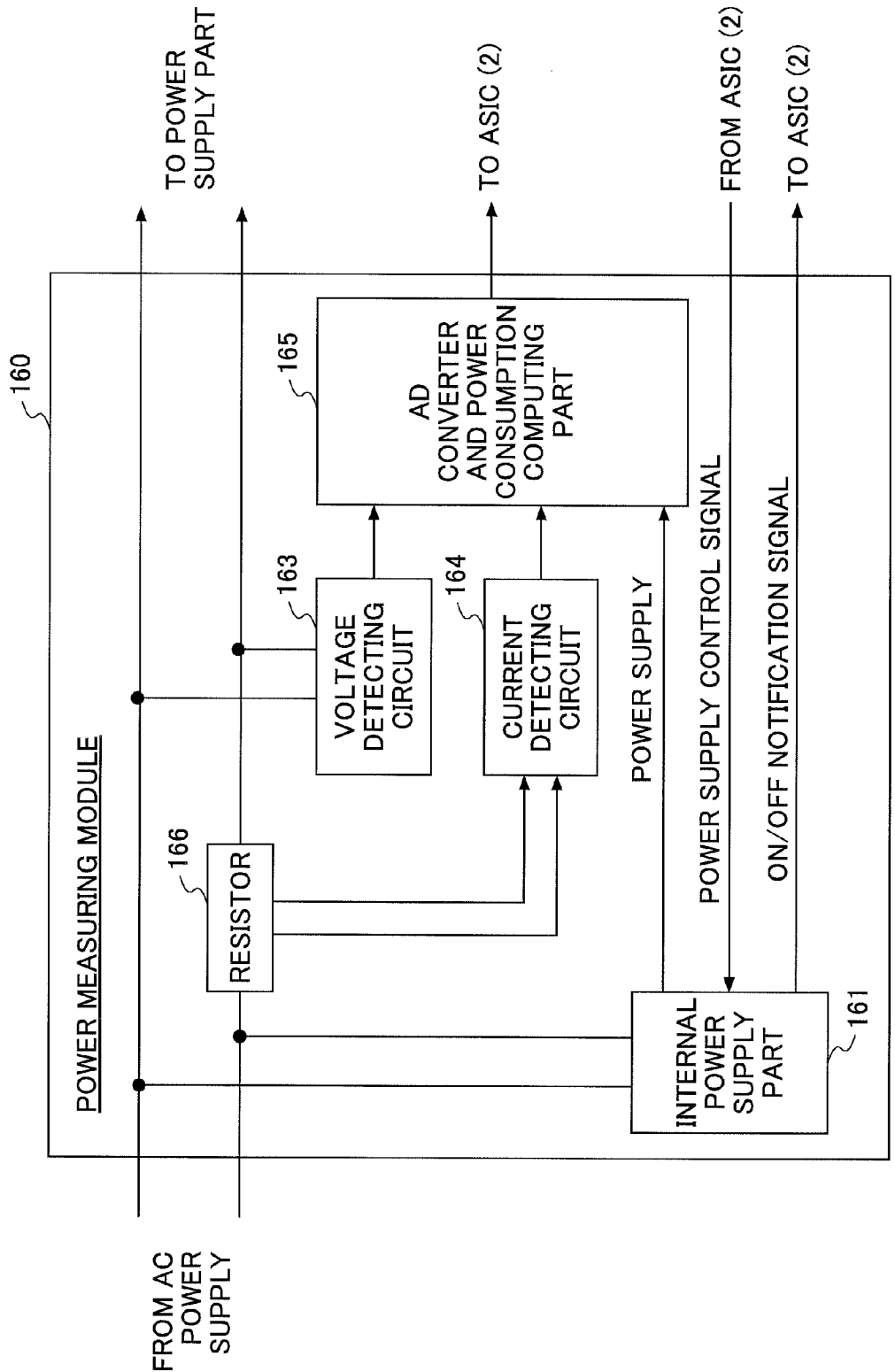
FIG. 15 is a block diagram showing the composition of a power measuring part (power measuring module) in the MFP of each of the embodiments of the present disclosure.

As shown in FIG. 15, the power supply measuring module 160 is constructed to include an internal power supply part 161, a resistor 166, a voltage detecting circuit 163, a current detecting circuit 164, and an AD-converter and power consumption computing part 165.

The internal power supply part 161 has a function that transforms into DC power the AC power supplied by the connecting unit 170, and supplies the DC power to the AD-converter and power consumption computing part 165. The internal power supply part 161 has a function that stops or restarts the supply of DC power to the AD-converter and power consumption computing part 165 according to a power source control signal output from the ASIC (2) 112. A stop of the electric power supply to the power supply measuring module 160 (electric power supply OFF) is equivalent to a stop of the DC electric power supply to the AD-converter and power consumption computing part 165. Similarly, a restart of the electric power supply to the power supply measuring module 160 (electric power supply ON) is equivalent to a start of the DC power supply to the AD-converter and power consumption computing part 165.

The internal power supply part 161 outputs an ON/OFF notification signal to the ASIC (2) 112. This ON/OFF notification signal indicates a stop of the electric power supply to the power supply measuring module 160 (electric power supply OFF) during a stop of the DC power supply to the AD-converter and power consumption computing part 165. The ON/OFF notification signal indicates a start of the electric power supply to the power supply measuring module 160 (electric power supply ON) during the DC electric power supply to the AD-converter and power consumption computing part 165.

The voltage detecting circuit 163 detects the AC voltage received from the connecting unit 170, and outputs a signal indicating the detection result to the AD-converter and power consumption computing part 165. The current detecting circuit 164 detects the AC current received from the connecting unit 170, based on a voltage value between the both ends of the resistor 166, and outputs a signal indicating the detection result to the AD-converter and power consumption computing part 165.

The AD-converter and power consumption computing part 165 converts into digital signals the signals received from the voltage detecting circuit 163 and from the current detecting circuit 164. Based on these digital signals, the power (namely, the power consumption) supplied to the components in the MFP (including the engine 130 and the controller 110) through the power measuring module 160 is computed. Next, the information of the computed power consumption is output to the ASIC (2) 112 in real time.

When the power measuring part 160 is arranged to compute the value of the power consumption as described above, the AD-converter and power consumption computing part 165 is arranged to include a function that computes the power consumption based on the computed power consumption value and outputs the information of the computed power consumption to the ASIC (2) 112 on real time.

In the foregoing embodiments, the MFPs have been illustrated as examples of the image forming device of the present disclosure. However, the present disclosure is not limited to the illustrated embodiments and can be applied to another commercially available image forming device.

The process of power consumption and display sequence performed by the MFP of the first embodiment as in the flowchart of FIG. 3 may be performed by the ASIC (2) 112 in the MFP of the first embodiment under the control of the CPU 111. In this case, the ASIC (2) 112 may be arranged to include functional parts 112a-112i as in the composition shown in FIG. 11. Alternatively, most of the process of FIG. 3 may be performed by only the hardware of the ASIC (2) 112 including the functional parts 112a-112i as in the composition shown in FIG. 11.

The process of power consumption and display sequence performed by the MFP of the second embodiment as in the flowchart of FIG. 5 may be performed by the ASIC (2) 112 in the MFP of the second embodiment under the control of the CPU 111. In this case, the ASIC (2) 112 may be arranged to include functional parts 112a-112k as in the composition shown in FIG. 12. Alternatively, most of the process of FIG. 5 may be performed by only the hardware of the ASIC (2) 112 including the functional parts 112a-112k as in the composition shown in FIG. 12.

The process of power consumption and display sequence performed by the MFP of the third embodiment as in the flowchart of FIG. 7 may be performed by the ASIC (2) 112 in the MFP of the third embodiment under the control of the CPU 111. In this case, the ASIC (2) 112 may be arranged to include functional parts 112a-112i and 112m as in the composition shown in FIG. 13. Alternatively, most of the process of FIG. 7 may be performed by only the hardware of the ASIC (2) 112 including the functional parts 112a-112i and 112m as in the composition shown in FIG. 13.

The process of power consumption and display sequence performed by the MFP of the fourth embodiment as in the flowchart of FIG. 10 may be performed by the ASIC (2) 112 in the MFP of the fourth embodiment under the control of the CPU 111. In this case, the ASIC (2) 112 may be arranged to include functional parts 112a-112i and 112n as in the composition shown in FIG. 14. Alternatively, most of the process of FIG. 10 may be performed by only the hardware of the ASIC (2) 112 including the functional parts 112a-112i and 112n as in the composition shown in FIG. 14.

Alternatively, most of the above-mentioned process of each embodiment may be performed by the CPU 111 executing the program stored in the NOR type flash memory 117.

Alternatively, the above-mentioned process of each embodiment may be performed by the hardware of the ASIC (2) 112 in collaboration with the CPU 111 executing the program in the flash memory.

As described in the foregoing, according to the present disclosure, it is possible to provide an image forming device which is capable of displaying the exact amount of power consumption that is in conformity with the measured amount of the power consumption, and capable of minimizing the increase of the power consumption.

The present disclosure is not limited to the specifically disclosed embodiments, and variations and modifications may be made without departing from the scope of the present disclosure.

The present application is based upon and claims the benefit of priority of Japanese patent application No. 2010-205665, filed on Sep. 14, 2010, and Japanese patent application No. 2011-155482, filed on Jul. 14, 2011, the contents of which are incorporated herein by reference in their entirety.

What is claimed is:

1. An image forming device having a plurality of functions, comprising:

a power measuring unit to measure a power consumption of the image forming device by measuring a total power entering the image forming device from a direct connection to an external power source, the power measuring unit including a power supply unit internal to the power measuring unit;

a power consumption computing unit to compute a power consumption for execution of one of the plurality of functions with power supplied from a power supply unit external to the power measuring unit, based on the power consumption measured by the power measuring unit;

a display unit to display the power consumption computed by the power consumption computing unit;

a storage unit to store a target power consumption range for each of the plurality of functions;

a measuring mode selecting unit to select one of a measuring mode in which electric power is supplied to the power measuring unit via the internal power supply unit and a non-measurement mode in which electric power is not supplied to the power measuring unit via the internal power supply unit; and a power consumption estimation unit to generate an estimated power consumption for execution of one of the plurality of functions in the non-measurement mode, wherein the measuring mode selecting unit selects the measuring mode when the estimated power consumption in the non-measurement mode generated by the power consumption estimation unit is beyond a target power consumption range for a corresponding one of the plurality of functions from the storage unit.

2. The image forming device according to claim 1, wherein the measuring mode selecting unit selects the non-measurement mode when a power consumption computed by the power consumption computing unit based on a power consumption measured by the power measuring unit in the measuring mode is within a target power consumption range for a corresponding one of the plurality of functions from the storage unit.

3. The image forming device according to claim 2, wherein the target power consumption range for each of the plurality of functions is determined so that a difference between a reference value of the power consumption computed for each of the plurality of functions and the power consumption computed based on the measured power consumption or the estimated power consumption is below a predetermined value.

4. The image forming device according to claim 3, further comprising an input unit to receive the predetermined value that is input to the image forming device.

5. The image forming device according to claim 3, wherein the measuring mode selecting unit is configured to determine whether a power consumption which is equal to the power consumption computed based on the measured power consumption or the estimated power consumption, and which is needed for image processing of a number of sheets that is the same as a number of sheets used to compute a reference value of the power consumption of a corresponding one of the plurality of functions is beyond the target power consumption range for the corresponding one of the plurality of functions.

6. The image forming device according to claim 1, further comprising a selection unit to select one of an ON state and an OFF state of the measuring mode selecting unit.

7. The image forming device according to claim 1, wherein the plurality of functions include at least a copier function, a printer function, a scanner function, and a facsimile function.

8. An image forming device controlling method which controls an image forming device having a plurality of functions, comprising:
   measuring, by a power measuring unit, a power consumption of the image forming device by measuring a total power entering the image forming device from a direct connection to an external power source, the power measuring unit including a power supply unit internal to the power measuring unit;
   computing, by a power consumption computing unit, a power consumption for execution of one of the plurality of functions with power supplied from a power supply unit external to the power measuring unit, based on the power consumption measured by the power measuring unit;
   displaying, by a display unit, the power consumption computed by the power consumption computing unit;
   storing, by a storage unit, a target power consumption range for each of the plurality of functions;
   selecting, by a measuring mode selecting unit, one of a measuring mode in which electric power is supplied to the power measuring unit via the internal power supply unit and a non-measurement mode in which electric power is not supplied to the power measuring unit via the internal power supply unit;
   generating, by a power consumption estimation unit, an estimated power consumption for execution of one of the plurality of functions in the non-measurement mode; and
   selecting, by the measuring mode selecting unit, the measuring mode when the estimated power consumption in the non-measurement mode generated by the power consumption estimation unit is beyond a target power consumption range for a corresponding one of the plurality of functions from the storage unit.

9. A non-transitory computer-readable recording medium storing a program which, when executed by a computer, causes the computer to perform an image forming device controlling method which controls an image forming device having a plurality of functions, the method comprising:
   measuring, by a power measuring unit, a power consumption of the image forming device by measuring a total power entering the image forming device from a direct connection to an external power source, the power measuring unit including a power supply unit internal to the power measuring unit;
   computing, by a power consumption computing unit, a power consumption for execution of one of the plurality of functions with power supplied from a power supply unit external to the power measuring unit, based on the power consumption measured by the power measuring unit;
   displaying, by a display unit, the power consumption computed by the power consumption computing unit;
   storing, by a storage unit, a target power consumption range for each of the plurality of functions;
   selecting, by a measuring mode selecting unit, one of a measuring mode in which electric power is supplied to the power measuring unit via the internal power supply unit and a non-measurement mode in which electric power is not supplied to the power measuring unit via the internal power supply unit;
   generating, by a power consumption estimation unit, an estimated power consumption for execution of one of the plurality of functions in the non-measurement mode; and
   selecting, by the measuring mode selecting unit, the measuring mode when the estimated power consumption in the non-measurement mode generated by the power consumption estimation unit is beyond a target power consumption range for a corresponding one of the plurality of functions from the storage unit.

* * * * *